US012313774B2

(12) United States Patent
Youn et al.

(10) Patent No.: US 12,313,774 B2
(45) Date of Patent: May 27, 2025

(54) DIRECTION OF ARRIVAL (DOA) ESTIMATION USING CIRCULAR CONVOLUTIONAL NETWORK

(71) Applicant: NXP B.V., Eindhoven (NL)

(72) Inventors: Jihwan Youn, Eindhoven (NL); Satish Ravindran, Santa Clara, CA (US); Ruud van Sloun, Eindhoven (NL); Ryan Haoyun Wu, San Jose, CA (US); Jun Li, San Jose, CA (US)

(73) Assignee: NXP B.V., Eindhoven (NL)

( * ) Notice: Subject to any disclaimer, the term of this patent is extended or adjusted under 35 U.S.C. 154(b) by 524 days.

(21) Appl. No.: 17/702,695

(22) Filed: Mar. 23, 2022

(65) Prior Publication Data
US 2023/0305111 A1    Sep. 28, 2023

(51) Int. Cl.
*G01S 7/41*    (2006.01)
*G01S 3/14*    (2006.01)
(Continued)

(52) U.S. Cl.
CPC ............... *G01S 7/417* (2013.01); *G01S 3/143* (2013.01); *G01S 7/415* (2013.01); *G06N 3/048* (2023.01); *G01S 2013/0245* (2013.01)

(58) Field of Classification Search
CPC .......... G01S 7/417; G01S 3/143; G01S 7/415; G01S 2013/0245; G06N 3/048
(Continued)

(56) References Cited

U.S. PATENT DOCUMENTS 5,194,870 A * 3/1993 Pearce .................... G01S 13/34
342/195
5,337,057 A * 8/1994 Michie .................... G01S 7/12
342/186
(Continued)

FOREIGN PATENT DOCUMENTS

| CN | 109683161 A | * | 4/2019 | ......... G01S 13/9094 |
| EP | 1194924 B1 | * | 12/2006 | ........... G10L 19/005 |
| EP | 1110209 B1 | * | 10/2008 | ........... G10L 19/005 |

OTHER PUBLICATIONS

Ravishankar et al: "Image Reconstruction: From Sparsity to Data-adaptive Methods and Machine Learning", arxiv.org, Cornell University Library, 201 Olin Library Cornell University Ithaca, NY 14853, Apr. 5, 2019 (Apr. 5, 2019), 20 pages.
(Continued)

*Primary Examiner* — Nuzhat Pervin

(57) ABSTRACT

Embodiments of systems and methods for estimating direction of arrival are disclosed. A device includes a signal processing unit that includes processing circuitry and memory coupled to the processing circuitry, where the processing circuitry includes multiple vector processing units, each vector processing unit configured to receive an antenna input vector, receive an angular spectrum vector, retrieve a first and second weighting vectors from the memory, generate a processed antenna input vector by performing a circular convolution of the antenna input vector with the first weighting vector, generate a processed angular spectrum vector by performing a circular convolution of the angular spectrum vector with the second weighting vector, and generate a refined angular spectrum vector, which indicates angular position of one or more radar targets, by applying a non-linear activation function to a sum of the processed antenna input vector and the processed angular spectrum vector.

22 Claims, 14 Drawing Sheets

(51) Int. Cl.
*G01S 13/02* (2006.01)
*G06N 3/048* (2023.01)

(58) Field of Classification Search
USPC .......................................................... 342/90
See application file for complete search history.

(56) References Cited

U.S. PATENT DOCUMENTS

| | | | | |
|---|---|---|---|---|
| 5,594,450 | A * | 1/1997 | Schober | G01S 7/2927 |
| | | | | 342/162 |
| 6,449,590 | B1 * | 9/2002 | Gao | G10L 19/265 |
| | | | | 704/211 |
| 6,480,822 | B2 * | 11/2002 | Thyssen | G10L 19/18 |
| | | | | 704/E19.041 |
| 6,493,665 | B1 * | 12/2002 | Su | G10L 19/083 |
| | | | | 704/E19.041 |
| 6,507,814 | B1 * | 1/2003 | Gao | G10L 19/09 |
| | | | | 704/E19.041 |
| 6,813,602 | B2 * | 11/2004 | Thyssen | G10L 19/18 |
| | | | | 704/E19.041 |
| 8,271,223 | B2 * | 9/2012 | Rawlins | H03F 1/0211 |
| | | | | 702/90 |
| 8,620,647 | B2 * | 12/2013 | Gao | G10L 19/09 |
| | | | | 704/214 |
| 8,730,096 | B2 * | 5/2014 | Kanamoto | G01S 3/74 |
| | | | | 342/107 |
| 9,176,735 | B2 * | 11/2015 | Azadet | G06F 9/3001 |
| 9,269,365 | B2 * | 2/2016 | Su | G10L 25/90 |
| 9,400,325 | B2 * | 7/2016 | Millar | G01S 7/42 |
| 9,915,730 | B2 * | 3/2018 | Mansour | G01S 13/888 |
| 10,234,543 | B2 * | 3/2019 | Mazzaro | G01S 7/354 |
| 10,637,544 | B1 * | 4/2020 | Shattil | H04B 7/0691 |
| 10,796,220 | B2 * | 10/2020 | Nekuii | G06N 3/063 |
| 10,797,766 | B1 * | 10/2020 | Shattil | H04W 72/046 |
| 11,187,788 | B2 * | 11/2021 | Lee | G01S 7/411 |
| 11,321,606 | B2 * | 5/2022 | Sharma | G06N 3/10 |
| 11,477,060 | B2 * | 10/2022 | Govea | G06N 3/08 |
| 11,677,449 | B2 * | 6/2023 | Shattil | H04W 72/046 |
| | | | | 375/267 |
| 11,734,214 | B2 * | 8/2023 | Youn | G06F 13/4027 |
| | | | | 710/306 |
| 2006/0273951 | A1 * | 12/2006 | Adams | G01S 7/282 |
| | | | | 342/194 |
| 2008/0133982 | A1 * | 6/2008 | Rawlins | H04B 1/0475 |
| | | | | 714/699 |
| 2008/0319740 | A1 * | 12/2008 | Su | G10L 25/90 |
| | | | | 704/E19.042 |
| 2009/0182558 | A1 * | 7/2009 | Su | G10L 25/90 |
| | | | | 704/230 |
| 2010/0321229 | A1 * | 12/2010 | Dwelly | G01S 7/415 |
| | | | | 342/28 |
| 2013/0031442 | A1 * | 1/2013 | Rawlins | H03F 1/3294 |
| | | | | 714/763 |
| 2015/0143076 | A1 * | 5/2015 | Khan | G06F 17/10 |
| | | | | 712/7 |
| 2015/0143078 | A1 * | 5/2015 | Khan | G06F 9/3895 |
| | | | | 712/7 |
| 2015/0143079 | A1 * | 5/2015 | Khan | G06F 9/38873 |
| | | | | 712/7 |
| 2016/0033622 | A1 * | 2/2016 | Martone | G01S 7/412 |
| | | | | 342/18 |
| 2016/0124086 | A1 * | 5/2016 | Jansen | G01S 13/931 |
| | | | | 342/107 |
| 2017/0307726 | A1 * | 10/2017 | Mazzaro | G01S 13/32 |
| 2018/0231636 | A1 * | 8/2018 | Maher | G01S 13/06 |
| 2019/0064339 | A1 * | 2/2019 | Kuo | G01S 13/4454 |
| 2019/0178985 | A1 * | 6/2019 | Roh | G01S 7/295 |
| 2019/0310346 | A1 * | 10/2019 | Lee | G01S 13/867 |
| 2020/0064455 | A1 * | 2/2020 | Schroder | G01S 13/325 |
| 2020/0182995 | A1 * | 6/2020 | Zeng | G01S 13/003 |
| 2020/0191943 | A1 * | 6/2020 | Wu | G01S 13/726 |
| 2020/0233062 | A1 * | 7/2020 | Kim | G01S 13/04 |
| 2020/0292662 | A1 * | 9/2020 | Boulanger | G01S 7/06 |
| 2020/0336344 | A1 * | 10/2020 | Govea | G06N 3/08 |
| 2020/0410331 | A1 * | 12/2020 | Ban | G06F 9/30036 |
| 2021/0021307 | A1 * | 1/2021 | Shattil | H04W 72/046 |
| 2022/0155440 | A1 * | 5/2022 | Kruse | G10K 11/348 |
| 2022/0342039 | A1 * | 10/2022 | Eschbaumer | G01S 7/415 |
| 2023/0081472 | A1 * | 3/2023 | Wang | H04W 4/029 |
| | | | | 340/539.12 |
| 2023/0089137 | A1 * | 3/2023 | Kruse | A61B 8/54 |
| | | | | 600/447 |

OTHER PUBLICATIONS

Guo et al.: "Position-enabled complex Toeplitz LISTA for DOA estimation with unknow mutual coupling", Signal Processing, Elsevier, Amsterdam, NL, vol. 194, Dec. 29, 2021 (Dec. 29, 2021), 9 pages.
Fu et al.: "Compressed LISTA Exploiting Toeplitz Structure", 2019 IEEE Radar Conference (Radarconf), IEEE, Apr. 22, 2019 (Apr. 22, 2019), pp. 1-6.
Youn, Jihwan et al. "Deep Learning Models for Fast Ultrasound Localization Microscopy", IEEE, (2020), 4 pgs.
Yang, Zai et al. "Sparse Methods for Direction-of-Arrival Estimation", Jan. 10, 2017, 65 pgs.
Monga, Vishal et al. "Algorithm Unrolling: Interpretable, Efficient Deep Learning for Signal and Image Processing", Aug. 7, 2020, 27 pgs.
Gregor, Karol et al. "Learning Fast Approximations of Sparse Coding", (2010), 8 pgs.
Fu, Rong et al. "Structured LISTA for Multidimensional Harmonic Retrieval", Feb. 23, 2021, 13 pgs.
Dardikman-Yoffe, Gili et al. "Learned SPARCOM: Unfolded Deep Super-Resolution Microscopy", Aug. 12, 2021, 23 pgs.
Wan, Liangtian, et al. Deep Learning Based Autonomous Vehicle Super Resolution DOA Estimation for Safety Driving, Jul. 2021, 15 pgs.

* cited by examiner

| METHOD | FISTA | T-LISTA | CC-LISTA256 | CC-LISTA32 |
|---|---|---|---|---|
| PRECISION | 0.98 | 0.95 | 0.99 | 1.00 |
| RECALL | 0.96 | 0.82 | 0.96 | 0.95 |
| MEAN LOCALIZATION ERROR | 0.30 | 0.38 | 0.29 | 0.28 |
| NUMBER OF COMPLEX MACs | ~73.9M | ~2.2M | ~3.9M | ~0.5M |
| NUMBER OF LEARNING PARAMETERS | - | 260609 | 15134 | 1918 |

PERFORMANCE COMPARISON ON TEST DATA

FIG. 7D

DIRECTION OF ARRIVAL (DOA) ESTIMATION USING CIRCULAR CONVOLUTIONAL NETWORK

BACKGROUND

Radar systems are often incorporated into vehicle sensor systems to support various features of Autonomous Driving (AD) and/or Advanced Driver-Assistance Systems (ADAS). In some applications, a radar system is used to determine the direction of arrival (DOA) of an object in the radar field of view (FOV). In situations where multiple closely spaced objects appear simultaneously in the radar FOV, it is important to be able to determine a DOA for each object and to distinguish between the closely spaced objects. Given constraints on vehicle sensor systems with regard to, for example, the speed at which decisions must be made and power consumption restrictions (e.g., for electric vehicles (EVs)), determining DOAs of objects in the FOV of a radar system with sufficient resolution to distinguish between closely spaced objects is not a trivial task.

SUMMARY

Embodiments of systems and methods for estimating DOA are disclosed. In one or more embodiments, a radar system includes an array of antennas, a radar transceiver connected to the array of antennas, and a signal processing unit connected to the radar transceiver and that includes processing circuitry and memory coupled to the processing circuitry, wherein the processing circuitry includes multiple vector processing units, each vector processing unit configured to receive an antenna input vector that is a representation of radar return signal amplitudes received by each antenna of the array of antennas, receive an angular spectrum vector that indicates a likelihood of a return signal originating from ranges of angles corresponding to each component of that vector, retrieve a first weighting vector and a second weighting vector for that vector processing unit from the memory, generate a processed antenna input vector by performing a circular convolution of the antenna input vector with the first weighting vector, generate a processed angular spectrum vector by performing a circular convolution of the angular spectrum vector with the second weighting vector, and generate a refined angular spectrum vector by applying a non-linear activation function to a sum of the processed antenna input vector and the processed angular spectrum vector, wherein the non-linear activation function specifies a non-linear mapping between input component values and output component values, where the processing circuitry is configured to output a final angular spectrum vector that indicates an estimated angular position of one or more radar targets with respect to the array of antennas based on refined angular spectrum vectors generated by each of the vector processing units.

In one or more embodiments, the signal processing unit includes an initial vector processing unit configured to receive the antenna input vector, retrieve a weighting vector for the initial vector processing unit from the memory, generate a processed antenna input vector by performing a circular convolution of the antenna input vector with the weighting vector, and generate a refined angular spectrum vector by applying a non-linear activation function to the processed antenna input vector, wherein the non-linear activation function specifies a non-linear mapping between the input vector component values and output vector component values.

In one or more embodiments, the signal processing unit includes a transformation engine configured to receive radar return signals, generate a transformed measurement vector representing the radar return signals and to provide the transformed measurement vector to the vector processing units as the antenna input vector.

In one or more embodiments, each vector processing unit of the multiple vector processing units includes circular convolution circuits dedicated to performing the circular convolutions, summing circuits dedicated to performing the summing, and activation function circuits dedicated to performing the non-linear activation function.

In one or more embodiments, a device includes a signal processing unit that includes processing circuitry and memory coupled to the processing circuitry, wherein the processing circuitry includes multiple vector processing units, each vector processing unit configured to receive an antenna input vector that is a representation of radar return signal amplitudes received by each antenna of an array of antennas, receive an angular spectrum vector that indicates a likelihood of a return signal originating from ranges of angles corresponding to each component of that vector, retrieve a first weighting vector and a second weighting vector for that vector processing unit from the memory, generate a processed antenna input vector by performing a circular convolution of the antenna input vector with the first weighting vector, generate a processed angular spectrum vector by performing a circular convolution of the angular spectrum vector with the second weighting vector, and generate a refined angular spectrum vector by applying a non-linear activation function to a sum of the processed antenna input vector and the processed angular spectrum vector, wherein the non-linear activation function specifies a non-linear mapping between input component values and output component values, wherein the processing circuitry is configured to output a final angular spectrum vector that indicates an estimated angular position of one or more radar targets with respect to the array of antennas based on refined angular spectrum vectors generated by each of the vector processing units.

In one or more embodiments, the signal processing unit includes an initial vector processing unit configured to receive the antenna input vector, retrieve a weighting vector for the initial vector processing unit from the memory, generate a processed antenna input vector by performing a circular convolution of the antenna input vector with the weighting vector, and generate a refined angular spectrum vector by applying a non-linear activation function to the processed antenna input vector, wherein the non-linear activation function specifies a non-linear mapping between input vector component values and output vector component values.

In one or more embodiments, the signal processing unit includes a transformation engine configured to receive radar return signals, generate a transformed measurement vector representing the radar return signals and to provide the transformed measurement vector to the vector processing units as the antenna input vector.

In one or more embodiments, the non-linear function is a sigmoid based smooth soft thresholding function.

In one or more embodiments, each vector processing unit of the multiple vector processing units includes circular convolution circuits dedicated to performing the circular convolutions, summing circuits dedicated to performing the summing, and activation function circuits dedicated to performing the non-linear activation function.

In one or more embodiments, the multiple vector processing units are configured for pipelined processing in which each vector processing unit of the multiple vector processing units performs the circular convolutions with first and second weighting vectors that are specific to the multiple vector processing units.

In one or more embodiments, the vector processing units are serially connected such that an intermediate estimated angular spectrum output vector from a first vector processing unit of the serially connected vector processing units is provided as the angular spectrum vector to a next vector processing unit of the serially connected vector processing units.

In one or more embodiments, the antenna input vector corresponds to a cell in a range Doppler map that indicates the presence of a target and wherein the antenna input vector is processed by the multiple vector processing units serially using first and second weighting vectors that are unique to each one of the multiple vector processing units for the circular convolutions.

In one or more embodiments, the multiple vector processing units are configured for parallel processing in which a single vector processing unit of the multiple vector processing units performs the circular convolutions, the summing, and the application of the non-linear function for each layer of a multilayer process, and wherein each layer of the multilayer process utilizes layer-specific first and second weighting vectors for the circular convolutions.

In one or more embodiments, the layer-specific first and second weighting vectors utilized for the circular convolutions are changed at the single vector processing unit to correspond to each layer of the multilayer process.

In one or more embodiments, a method for estimating a DOA from radar signals involves at vector processing units of a signal processing unit that includes processing circuitry and memory coupled to the processing circuitry and that is connected to a radar transceiver, receiving an antenna input vector that is a representation of radar return signal amplitudes received by each antenna of the array of antennas, receiving an angular spectrum vector that indicates a likelihood of a return signal originating from ranges of angles corresponding to each component of that vector, retrieving a first weighting vector and a second weighting vector for that vector processing unit from the memory, at a circular convolution engine, generating a processed antenna input vector by performing a circular convolution of the antenna input vector with the first weighting vector, at the circular convolution engine, generating a processed angular spectrum vector by performing a circular convolution of the angular spectrum vector with the second weighting vector, and at an activation function engine, generating a refined angular spectrum vector by applying a non-linear activation function to a sum of the processed antenna input vector and the processed angular spectrum vector, wherein the non-linear activation function specifies a non-linear mapping between input component values and output component values, where the processing circuitry outputs a final angular spectrum vector that indicates an estimated angular position of one or more radar targets with respect to the array of antennas based on refined angular spectrum vectors generated by each of the vector processing units.

In one or more embodiments, the signal processing unit includes initial steps of receiving the antenna input vector, retrieving a weighting vector for the initial vector processing unit from the memory, generating a processed antenna input vector by performing a circular convolution of the antenna input vector with the weighting vector, and generating a refined angular spectrum vector by applying a non-linear activation function to the processed antenna input vector, wherein the non-linear activation function specifies a non-linear mapping between the input vector component values and output vector component values.

In one or more embodiments, the non-linear function is a sigmoid based smooth soft thresholding function.

In one or more embodiments, the multiple vector processing units are configured for pipelined processing in which each vector processing unit of the multiple vector processing units performs the circular convolutions with first and second weighting vectors that are specific to the multiple vector processing units.

In one or more embodiments, the vector processing units are serially connected such that a refined angular spectrum vector from a first vector processing unit of the serially connected vector processing units is provided as the angular spectrum vector to a next vector processing unit of the serially connected vector processing units.

In one or more embodiments, the antenna input vector corresponds to a cell in a range Doppler map that indicates the presence of a target and wherein the antenna input vector is processed by the multiple vector processing units serially using first and second weighting vectors that are unique to each one of the multiple vector processing units for the circular convolutions.

In one or more embodiments, the multiple vector processing units are configured for parallel processing in which a single vector processing unit of the multiple vector processing units performs the circular convolutions, the summing, and the application of the non-linear function for each layer of a multilayer process, and wherein each layer of the multilayer process utilizes layer-specific first and second weighting vectors for the circular convolutions.

In one or more embodiments, the layer-specific first and second weighting vectors utilized for the circular convolutions are changed at the single vector processing unit to correspond to each layer of the multilayer process.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 7D is a table of performance metrics for the FISTA, T-LISTA, CC-LISTA$_{256}$, and CC-LISTA$_{32}$ methods.

Throughout the description, similar reference numbers may be used to identify similar elements.

DETAILED DESCRIPTION

Figure 1:
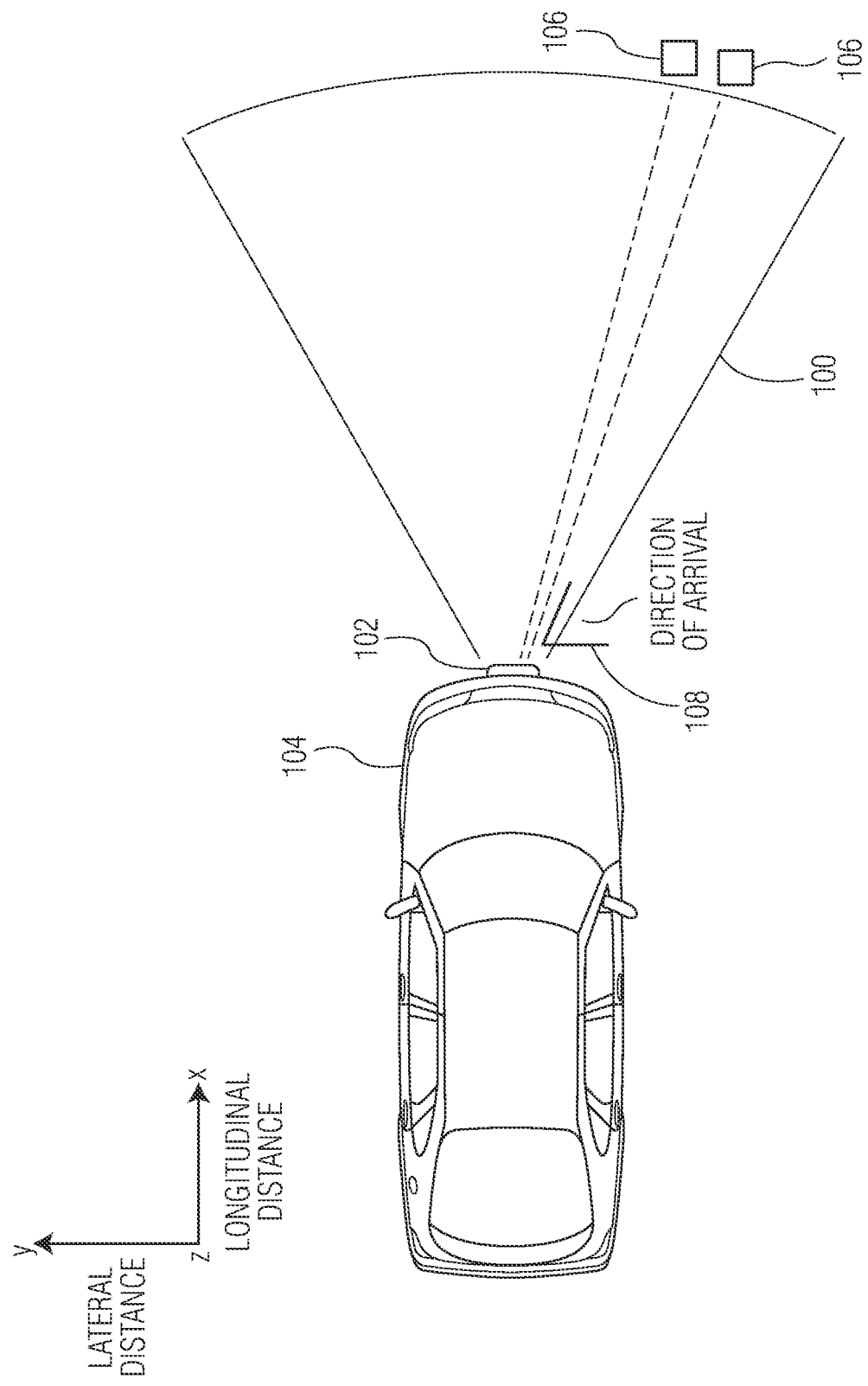
FIG. 1 illustrates the field of view (FOV) of a radar system that is integrated into a vehicle.

In the following description, various specific details are set forth to describe specific examples for a better understanding of the present disclosure. It should be apparent to one skilled in the art, however, that one or more other examples and/or variations of these examples may be practiced without all the specific details given below. In other instances, well known features have not been described in detail so as not to obscure the description of the examples herein. For ease of illustration, the same or similar reference numerals may be used in different figures to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

As may be appreciated, the examples described herein may be used in automotive applications via radar-signal transceiver circuitry having front-end circuitry which sends chirp sequences via transmit antennas and receives responsive chirps via receive antennas, and having logic and/or computer processing circuitry to prepare the signal to be transmitted and interpret the reflections. In one or more embodiments, chirp sequences may be a linearly increasing frequency signal (e.g., linear frequency modulation (LFM)) and reflected portions of the transmitted chirps are returned to the radar signal transceiver circuitry, as is common in frequency modulated continuous wave (FMCW) radar systems. The processing circuitry may include an analog-to-digital converter (ADC) and a timing circuit to mix the transmitted chirps with the responsive chirps (e.g., the reflections) and to generate a digital stream of data from the mixture. In operation, a sequence of chirps (e.g., a frequency ramp signal) is transmitted and a portion of the transmitted signal reflects off objects in the radar FOV and comes back to the transceiver circuitry with a given delay, which represents the time-of-flight useful for detecting objects and, optionally, estimating their distance. After mixing of the received signal with the transmitted signal, the delay results in a sinusoidal wave signal with a beat frequency (or beat signal) which may be further processed via an ADC with assistance of a range FFT to process peaks in such signals to indicate if objects (also referred to as targets) are present at different distances (e.g., ranges). By storing a number of range FFTs and transposing the stored data, velocity FFTs may be computed and, similarly, the results of the velocity FFTs are stored. A resulting data matrix is known as a range Doppler map as the matrix contains range and Doppler information about the targets. The range Doppler map is processed and the peaks are identified as targets, with a target list being generated as an output of the transceiver. The target list may be generated using two or three dimensional fast Fourier transformation (2D- or 3D-FFT) to show the position and velocity of each target.

Current state of the art imaging radar systems for vehicle sensor systems typically include sparse code processing for high resolution DOA estimation, which uses the underlying sparsity of the radar signals in a transformed state to recover individual signals. Sparse code processing has some drawbacks, which may include, 1) iterative optimizations to estimate sparse codes require many iterations to converge and may not be suitable for real time AD and ADAS applications, and 2) prior assumptions about underlying data distributions typically do not reflect real world data distributions, which can lead to suboptimal performance. Such drawbacks tend to cause domain experts to spend many hours tuning the parameters of conventional algorithms to achieve acceptable performance. More recently, deep neural networks (DNNs), which are trained with large datasets, have been applied to the problem of DOA estimation. However, success has been limited at least in part because, 1) purely data-driven models require a large amount of annotated training data to ensure robustness when subjected to out of distribution inputs, while creating annotations for real world scenarios is a resource intensive endeavor; and 2) traditional DNNs are computationally heavy and require large amounts of memory, and may require pruning and optimizations to enable implementation in low Size, Weight, and Power (SWaP) hardware.

In accordance with an embodiment of the invention, systems and methods for estimating DOA using radar systems are disclosed. The systems and methods apply circular convolutions to generate high-resolution DOA estimates, which enables multiple closely spaced objects in a radar FOV to be reliably distinguished from each other. In one or more embodiments, a radar system includes an array of antennas, a radar transceiver connected to the array of antennas, and a signal processing unit connected to the radar transceiver and that includes processing circuitry and memory coupled to the processing circuitry. The processing circuitry includes multiple vector processing units, each vector processing unit configured to receive an antenna input vector that is a representation of radar return signal amplitudes received by each antenna of the array of antennas, receive an angular spectrum vector that indicates a likelihood of a return signal originating from ranges of angles corresponding to each component of that vector, retrieve a first weighting vector and a second weighting vector for that vector processing unit from the memory, generate a processed antenna input vector by performing a circular convolution of the antenna input vector with the first weighting vector, generate a processed angular spectrum vector by performing a circular convolution of the angular spectrum vector with the second weighting vector, and generate a refined angular spectrum vector by applying a non-linear activation function to a sum of the processed antenna input vector and the processed angular spectrum vector, where the non-linear activation function specifies a non-linear mapping between input component values and output component values, and where the processing circuitry is configured to output a final angular spectrum vector that indicates an estimated angular position of one or more radar targets with respect to the array of antennas based on refined angular spectrum vectors generated by each of the vector processing units. Applying circular convolutions to implement DOA estimation can improve performance of radar systems, especially, radar systems that are incorporated into vehicle sensor systems, in that the DOA estimation 1) requires no assumptions about the object distribution including number of objects, thereby increasing generalization to real world scenarios and improving robustness, 2) can be implemented in hardware with a small memory and compute footprint and with simple mathematical operations, which facilitates design of smaller hardware IP blocks with simpler instruction sets, and 3) can be implemented with a relatively small training dataset and fewer training resources as compared to known end-to-end data-driven approaches.

FIG. 1 illustrates the field of view (FOV) 100 of a radar system 102 that is integrated into a vehicle 104 oriented relative to x and y axes. In particular, FIG. 1 is a top view that shows an azimuth component (e.g., in the y-axis) of the FOV while an elevation component (e.g., in the z-axis) of the FOV may be shown by a side view of the vehicle. FIG. 1 also illustrates two objects 106 (also referred to as targets) that are in the FOV of the radar system and an angle 108 that corresponds to the DOA of one of the objects. As illustrated in FIG. 1, the DOA is the angle between the y-axis and a straight line between the radar system and the object. As is described below, the radar system is configured to implement circular convolutions to determine the DOAs of the objects. Although not shown in FIG. 1, the radar system may include components that enable multiple different FOVs, e.g., a short-range radar, a medium-range radar, and a long-range radar. As is known in the field, vehicle radar systems may be useful in connection with AD and ADAS features such as Automatic Cruise Control, Automatic Emergency Braking, and Front-Cross Traffic Alert.

Figure 2:
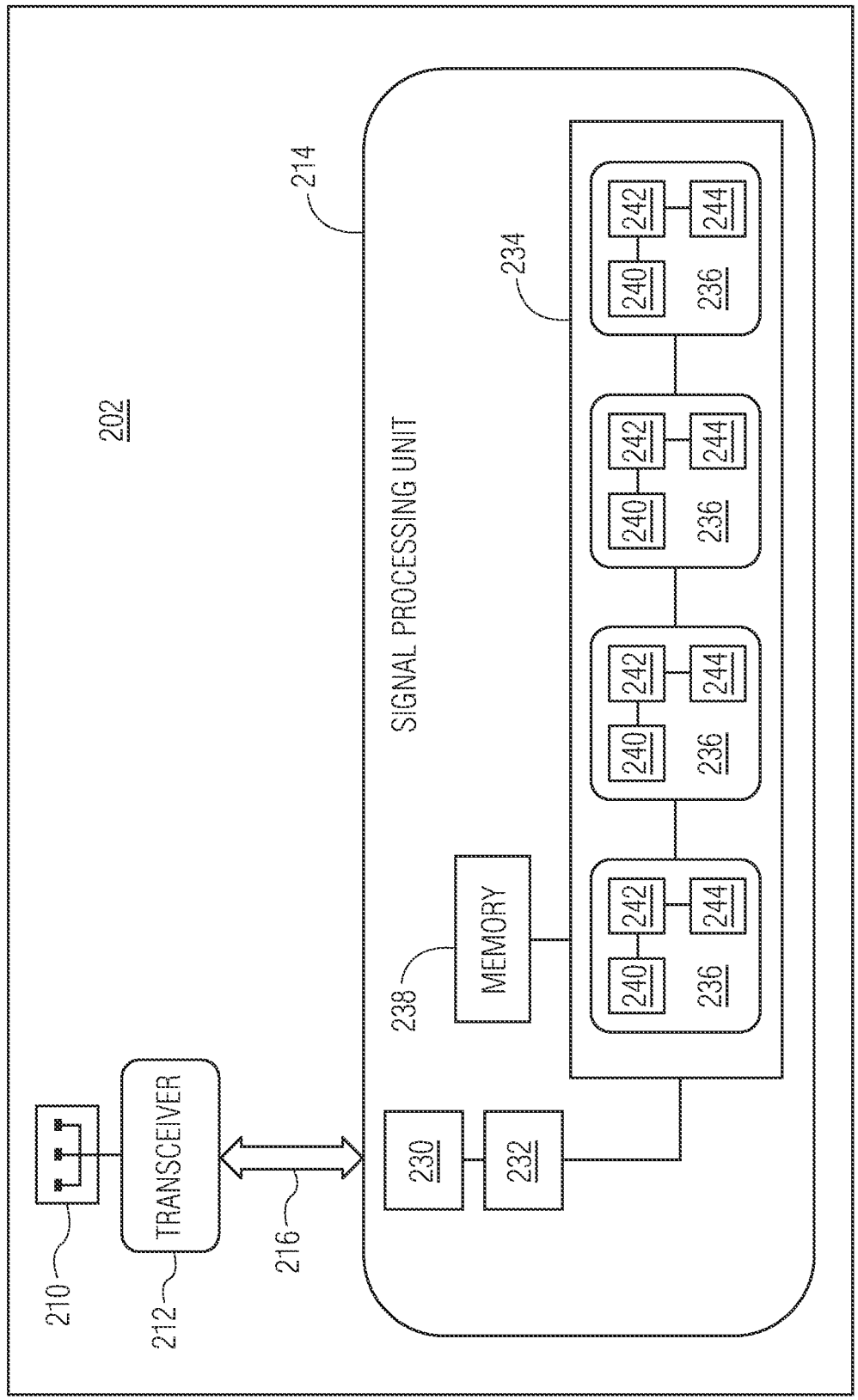
FIG. 2 depicts an embodiment of a radar system that is configured to implement circular convolutions to determine the DOAs of objects and that can be integrated into the vehicle as shown in FIG. 1.

FIG. 2 depicts an embodiment of a radar system 202 that is configured to implement circular convolutions to determine the DOAs of objects and that can be integrated into the vehicle 104 as shown in FIG. 1. The radar system includes an array of antennas 210, a radar transceiver 212, and a signal processing unit 214 that is connected to the transceiver by an interface 216 such as a Camera Serial Interface (CSI) as specified by the Mobile Industry Processor Interface (MIPI) Alliance.

Figure 3:
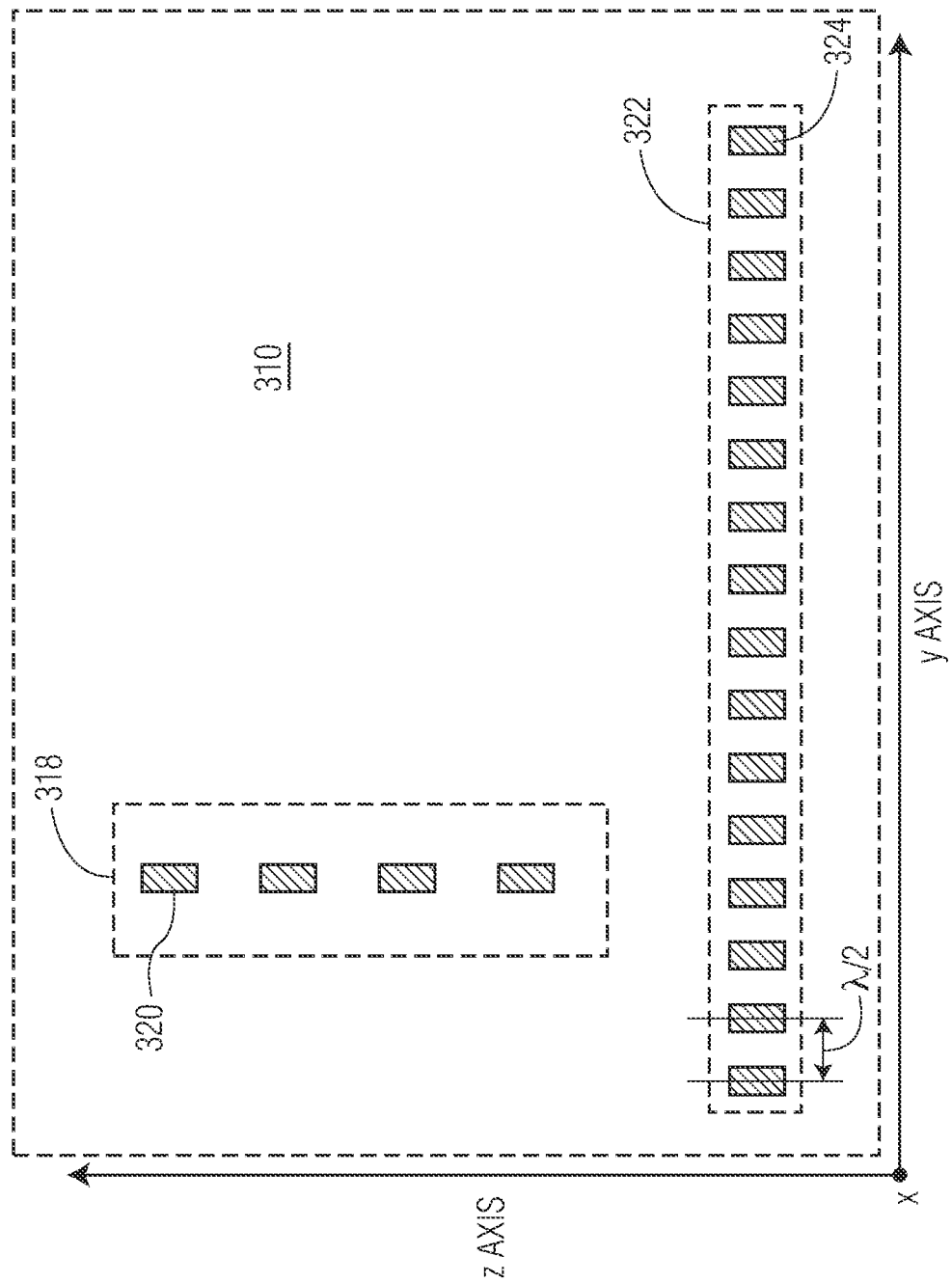
FIG. 3 depicts an example of an array of antennas for the radar system of FIG. 2.

The array of antennas 210 may be an antenna array as is known in the field. FIG. 3 depicts an example of an array of antennas 310 for the radar system that includes an array of transmit antennas 318 (transmit antenna array) that includes multiple transmit antennas 320 and an array of receive antennas 322 (receive antenna array) that includes multiple receive antennas 324. For example, the transmit and receive antennas are patch antennas that are configured for a particular wavelength range such as 75-76 GHz. In the example of FIG. 3, the transmit antennas are configured in a linear array of four antennas along the z-dimension and the receive antennas are configured in a linear array of twelve antennas along the y-dimension. In one or more embodiments, the transmit antennas are evenly spaced along the z-dimension at, for example, $\lambda/2$ (where $\lambda$ is the center wavelength of the wavelength range that is used for linear frequency modulation) and the receive antennas are evenly spaced along the y-dimension at, for example, $\lambda/2$ intervals. The configuration of the transmit and receive antennas could be used with different MIMO processing techniques to estimate the DOA in both elevation and azimuth. Although an example antenna array is described with reference to FIG. 3, other configurations of the antenna array are possible, including numbers of antennas, spacing (uniform or sparse), and location of the antennas. In one embodiment, there are four transmit antennas and eight receive antennas, which have sparse spacing, however, other combinations of antennas are possible.

Returning back to FIG. 2, the transceiver 212 may include transmit and receive components such as filters, mixers, power amplifiers, low noise amplifiers, digital-to-analog converters (DACs) and analog-to-digital converters (ADCs) configured to generate antenna input vectors having component values derived from amplitudes of radar signals received by each receive antenna of the antenna array 210. In one or more embodiments, the transceiver is a stand-alone integrated circuit (IC) device. The signal processing unit 214 includes a range Doppler processing engine 230, an antenna array construction engine 232, a cluster 234 of vector processing units 236 that includes multiple individual vector processing units, and memory 238. In one or more embodiments, the range Doppler engine is configured to implement range FFT (e.g., fast-time range FFT) and Doppler FFT (e.g., slow-time Doppler FFT) to transform the input antenna vectors of radar return signal amplitudes received by each antenna of the antenna array to transformed measurement vectors. The range Doppler engine may also implement target detection (e.g., constant false alarm rate (CFAR)). The antenna array construction engine is configured to construct a vector such as a MIMO virtual array measurement vector for each cell in the range Doppler map in which a target is detected. Additionally, the antenna array construction engine may further operate as a transformation engine to transform the antenna input vectors by projecting vectors into a different subspace by multiplying the measurement vectors by the conjugate transpose of a steering vector (e.g., Hermitian transpose, $A^H$). The antenna input vectors corresponding to each cell in the range Doppler map in which a target is detected are then passed to the cluster of vector processing units for DOA estimation. For example, in one or more embodiments, the antenna input vectors corresponding to each cell in the range Doppler map in which a target is detected are passed from the transformation engine to the cluster of vector processing units as transformed measurement vectors, which have been transformed by, for example, projecting vectors into a different subspace by multiplying the vectors by the conjugate transpose of a steering vector (e.g., Hermitian transpose, $A^H$). As is described in more detail below, the vector processing units in the cluster of vector processing units include a circular convolution engine 240, a vector summing engine 242, and an activation engine 244. However, before describing the vector processing units in further detail, the theory of operation of the radar system is explained.

With regard to the explanation of the theory of operation, first some mathematical background information about a typical sparse code processing framework is provided, followed by derivations on how to arrive at the final implementation of the disclosed DOA estimation, which involves using unrolled circular convolutions.

The radar signal model can be formulated by:

$$y = Ax + n, \quad (1)$$

where $y \in \mathbb{C}^{M \times 1}$ is the received radar signals after demodulation and M is the number antennas, $x \in \mathbb{C}^{N \times 1}$ is the sparse reflection coefficient at each angle bin, N is the number of angle bins, n is the observed noise, and A is the steering matrix, which is defined as:

$$A = [a_0 \; a_1 \; \ldots \; a_{N-1}] \in \mathbb{C}^{M \times N} \text{ with,}$$

$$a_i = \begin{bmatrix} 1 \\ \exp\left(j2\pi \frac{d \sin(\theta_i)}{\lambda}\right) \\ \vdots \\ \exp\left(j2\pi(M-1)\frac{d \sin(\theta_i)}{\lambda}\right) \end{bmatrix}_{for \; i \in \{0,1,\ldots,N-1\}}.$$

where, d is the spacing between the antennas, M is the number of antennas, and N is the number of angle bins (e.g., maximum number of detectable targets). The received signal after demodulation at the i-th antenna is given by:

$$y_i = \sum_{K=1}^{S} c_k \exp\{j2\pi(if_k + \phi_k)\} \quad (2)$$

for $i \in \{0, 1, \ldots, M-1\}$, where $c_k$ is the reflection coefficient of the k-th target, is the phase shift of the k-th target, S is the number of targets, and $$f_k = \frac{d \sin(\theta_k)}{\lambda}$$

is the normalized frequency that represents the k-th target angle $\theta_k$.

DOA estimation is an underdetermined problem as M«1V, so the sparsity of x can be utilized to obtain the correct solution as follows:

$$\hat{x} = \arg\min_{x} \|y - Ax\|^2 + \lambda \|x\|_0 \quad (3)$$

where $\lambda \in \mathbb{R}_+$ balances the trade-off between the reconstruction error and the sparsity of x. However, equation (3) is nonconvex, and solving the equation is non-deterministic polynomial-time (NP)-hard due to the $l_0$ norm. So, the $\ell_1$ norm is often used to approximate the $\ell_0$ norm as follows:

$$\hat{x} = \arg\min_{x} \|y - Ax\|^2 + \lambda \|x\|_1 \quad (4)$$

The $l_1$ norm can enforce the solution $\hat{x}$ to be sparse similar to the $l_0$ norm while making the optimization problem convex.

By relaxing the nonconvexity using the $l_1$ norm, convex optimization such as an iterative shrinkage thresholding algorithm (ISTA) can be applied to solve the problem as shown in equation (4). ISTA is an iterative algorithm that optimizes the data consistency (i.e., the first term) and the sparsity of the solution (i.e., the second term) alternatively at each iteration. The update at each iteration is given by:

$$x_{l+1} = prox_{\lambda\|\cdot\|_1}(x_l - \mu A^H(Ax_l - y)), \quad (5)$$
$$= prox_{\lambda\|\cdot\|_1}((I - \mu A^H A)x_l + \mu A^H y),$$

where l is an index of iteration, μ is the step size, I is the Identity matrix, $A^H$ is the conjugate transpose (e.g., Hermitian transpose) of A, λ is the regularization coefficient, and $prox_{\lambda\|\cdot\|_1}(\cdot)$ is the proximal operator of the $\ell_1$ norm, soft thresholding, which is defined by:

$$prox_{\lambda\|\cdot\|_1}(z) = sgn(z)(|z| - \lambda)_+ \forall_z \in \mathbb{C}. \quad (6)$$

With the above-provided background, attention is turned to the disclosed technique for estimating DOA.

Deep unfolding (also referred to as deep unrolling) is a technique that involves unfolding a conventional iterative algorithm as a neural network by translating one iteration of the algorithm to one layer of the neural network. An example of such unfolding is described by Vishal Monga et al., *Algorithm Unrolling: Interpretable, Efficient Deep Learning for Signal and Image Processing*, IEEE Signal Processing Magazine, 38(2):18-44, 2021. Learned ISTA (LISTA) is an unfolded version of ISTA that effectively approximates ISTA. An example of LISTA is described by Karol Gregor et al., *Learning fast approximations of sparse coding*, ICML 2010—Proceedings, 27th International Conference on Machine Learning, pages 399-406, 2010. LISTA is constructed as an L-layer neural network by reformulating equation (5) as:

$$x_{l+1} = prox_{\lambda_l\|\cdot\|_1}(W_t^l x_l + W_e^l y) \quad (7)$$

with l (layer) ranging from 0 to L−1, where L is the number of layers, and setting $W_t^l \in \mathbb{C}^{N \times N}$, and $W_e^l \in \mathbb{C}^{N \times M}$, and $\lambda_l \in \mathbb{R}_+$ as learning parameters. This is similar to a multilayer perceptron with the proximal operator functioning as the activation. Compared to ISTA, LISTA can achieve more robust performance with fewer iterations by learning optimal parameters from data during training.

Also, by formulating the neural network based on the underlying physical model, fewer learning parameters are required than model-agnostic and end-to-end data-driven neural networks, which allows easier and faster training and better generalization.

The model described above may still have drawbacks as the size of the learning parameters ($W_t$ with a size of $LN^2$, where L is the number of layers and $N^2$ is the size of the matrix, where N is the number of angle bins) is still quite large. Within this context, the use of Toeplitz LISTA (T-LISTA) has been proposed as described by Rong Fu et al., Structured LISTA for Multidimensional Harmonic Retrieval, IEEE Transactions on Signal Processing, 69:3459-3472, 2021. According to T-LISTA, the matrix multiplication of the first term in equation (7) is replaced by convolution using the fact that $A^H A$ is a Toeplitz matrix. Because $A^H A$ is a Toeplitz matrix, the matrix $(1 - \mu A^H A)$ in equation (5) also becomes a Toeplitz matrix. Therefore, the Toeplitz constraint can be applied to $W_t$. Note that multiplication of a Toeplitz matrix and a vector can be constructed by convolution of two vectors. From this, T-LISTA can be expressed as:

$$x_{l+1} = prox_{\lambda_l\|\cdot\|_1}(w_t^l x_l + W_e^l y) \quad (8)$$

where $w_t^l \in \mathbb{C}^{(2N-1) \times 1}$ is the learning parameter that substitutes for $W_t^l$. This results in a substantial reduction in the number of parameters from $\mathcal{O}(N^2)$ to $\mathcal{O}(N)$. However, the matrices $W_e$ are still preserved in T-LISTA, which is another high-demand computational overhead.

Given the above approach to estimating DOA, the matrix multiplication in LISTA can be replaced with circular convolution under a spatial invariance assumption. That is, spatial invariance is a result of the fact that the phase shifts between the received signal at each antenna pair/angle bin is constant. The spatial invariance assumption holds for the DOA estimation by considering the problem in the angle domain. Under the spatial invariance assumption, $A^H A$ turns out to be a circulant matrix which is exploited to reduce the number of learning parameters and to reduce the number of computation operations that are needed. In particular, if the term $$\frac{1}{M} A^H$$

is multiplied on both sides of equation (1) while ignoring the noise, then the equation can be expressed as:

$$\frac{1}{M} A^H y = \frac{1}{M} A^H A x \qquad (9)$$

Here, $$\frac{1}{M} A^H A$$

is a circulant matrix whose columns (or equivalently rows) are composed of cyclically shifted versions of a vector. Therefore, equation (9) can be rewritten as:

$$\bar{y} = \bar{A} x = \bar{a}_0 \circledast x, \qquad (10)$$

$$\bar{y} = \frac{1}{M} A^H y, \quad \bar{A} = \frac{1}{M} A^H A,$$

where $\bar{a}_0$ is the first column of $\bar{A}$, and $\circledast$ denotes circular convolution. Considering that $$\frac{1}{M} A^H y$$

is the zero-padded Fourier transform of y, equation (10) shows that the antenna input vector, e.g., transformed measurement vector, $\bar{y}$, can be represented by the circular convolution of an array response, $\bar{a}_0$, and the amplitude of targets at each angle bin x.

Accordingly, embodiments herein modify previous LISTA approaches to exploit circular convolutions in place of matrix multiplication operations. Such embodiments are referred to herein as circular convolutional LISTA ("CC-LISTA"). Equations describing CC-LISTA can be derived by exploiting circular convolution as follows:

$$\begin{aligned} x_{l+1} &= \text{prox}_{\lambda_l \|\cdot\|_1} (x_l - \mu \bar{A}^H (\bar{A} x_l - \bar{y})), \\ &= \text{prox}_{\lambda_l \|\cdot\|_1} ((I - \mu \bar{A}^H \bar{A}) x_l + \mu \bar{A}^H \bar{y}), \\ &= \text{prox}_{\lambda_l \|\cdot\|_1} \left( \left( I - \mu \left( \frac{1}{M} A^H A \right) \left( \frac{1}{M} A^H A \right) \right) x_l + \mu \left( \frac{1}{M} A^H A \right) \bar{y} \right), \\ &= \text{prox}_{\lambda_l \|\cdot\|_1} ((I - \mu W_c W_c) x_l + \mu W_c \bar{y}), \\ &= \text{prox}_{\lambda_l \|\cdot\|_1} (\bar{w}_t^l \circledast x_l + \bar{w}_e^l \circledast \bar{y}). \end{aligned} \qquad (11)$$

where $\bar{w}_t^l \in \mathbb{C}^{K \times 1}$ and $\bar{w}_e^l \in \mathbb{C}^{K \times 1}$ are the learning parameters, collectively referred to as weighting vectors, with l (layer) ranging from 0 to L−1, and $W_c$ is a circulant matrix. The derivation follows from the fact that the product of circulant matrices is also a circulant matrix. The size of the weighting vectors, $\bar{w}_t^l$ and $\bar{w}_e^l$, should be N from the mathematical derivation. However, it has been found that the kernel size, K, can be smaller than N. In one or more embodiments, to satisfy the properties of circular convolution in the frequency domain, the kernel was zero padded to make the two array sizes the same. However, zero padding of the kernel is unnecessary if the circular convolution is implemented in the spatial domain.

By recognizing the spatial invariance constraint, an implementation of CC-LISTA requires a much smaller number of learning parameters (e.g., fewer parameters in the weighting vectors) compared to LISTA and T-LISTA. That is, replacing the matrix multiplication in LISTA with a circular convolution allows the number of learning parameters to be reduced. For example, the required number of learning parameters per layer is 2K+1, where K is the kernel size (e.g., K learning parameters for each weighting vector, $\bar{w}_t^l$ and $\bar{w}_e^l$, and 1 for $\lambda_l$) for CC-LISTA, whereas LISTA and T-LISTA require $N^2$+MN+1 ($N^2$ learning parameters for $\bar{w}_t^l$, MN for $\bar{w}_e^l$ and 1 for λ) and 2N+MN (2N−1 for $\bar{w}_t^l$, MN for $\bar{w}_e^l$ and 1 for λ) learning parameters. Consequently, CC-LISTA is computationally more efficient than corresponding LISTA and T-LISTA implementations. For example, the number of complex multiply-accumulate (MAC) operations for one iteration for CC-LISTA is 2KN+N (e.g., KN for circular convolution with weighting vectors, $\bar{w}_t^l$ and $\bar{w}_e^l$, and N for soft thresholding), whereas complex MAC operations for LISTA and T-LISTA are $N^2$+MN+N ($N^2$ matrix multiplication with $W_t^l$ or convolution with $w_t^l$, MN for matrix multiplication with $W_e^l$, and N for soft thresholding), e.g., when 2KN+N<$N^2$+MN+N (K<(M+N)/2). An additional comparison of performance characteristics, including MAC operations, is provided below with reference to FIGS. 7A-7D.

Figure 4:
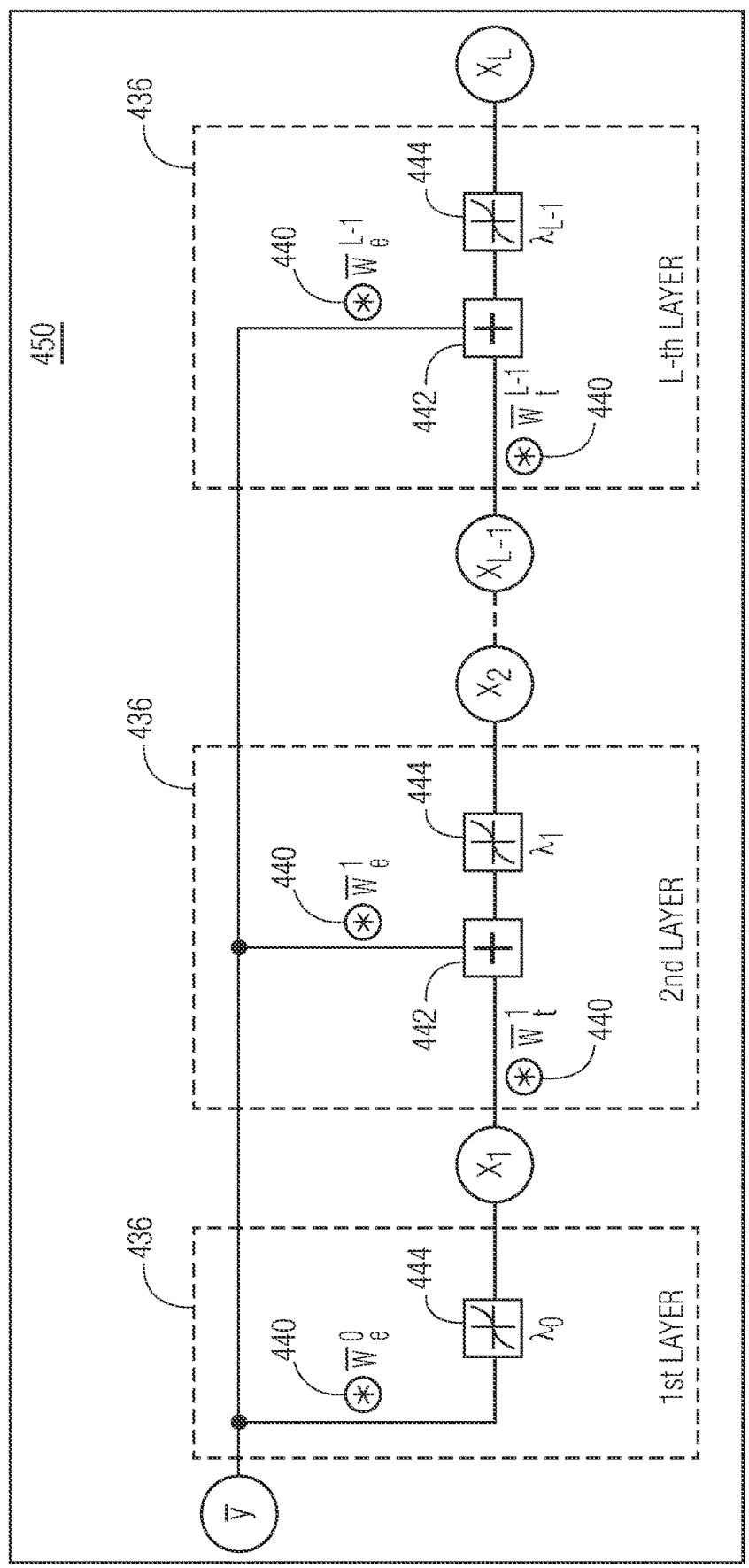
FIG. 4 is a functional block diagram of an example network structure that can be used to implement a circular convolution learned iterative shrinkage thresholding (CC-LISTA).

FIG. 4 is a functional block diagram of an example network structure 450, referred to as a circular convolutional neural network, that can be used to implement CC-LISTA. In the example of FIG. 4, the process for estimating a DOA is implemented as an L-layer CC-LISTA in which each layer 436 implements at least one circular convolution and a non-linear activation function. As is described below, the circular convolutional neural network of FIG. 4 can be implemented via the cluster 234 of vector processing units 236 and memory 238 of the signal processing unit 214 in the radar system 202 of FIG. 2.

Referring to FIG. 4 and moving from left to right, at the first layer (e.g., layer 1), an antenna input vector is received. In one or more embodiments, the antenna input vector is received as a transformed measurement vector ($\bar{y}$) that is generated in the signal processing unit (FIG. 2, 214) by transforming radar return signal amplitudes received by each antenna of an array of antennas into a different subspace by multiplying the corresponding vectors by the conjugate transpose of the steering vector. A processed antenna input vector is generated by performing a circular convolution 440 ($\circledast$) of the antenna input vector ($\bar{y}$) with a weighting vector ($\bar{w}_e^0$) (i.e., a layer-specific antenna spectrum weighting vector) that is retrieved from memory. Next, a refined angular spectrum vector ($x_1$) is generated by applying a non-linear activation function 444 ($\lambda_0$) (e.g., a soft thresholding function such as a sigmoid-based smooth soft-thresholding function) to the processed antenna input vector. In one or more embodiments, the non-linear activation function specifies a non-linear mapping between input component values and output component values.

At the second layer (e.g., layer 2), the antenna input vector ($\bar{y}$) and the refined angular spectrum vector ($x_1$) are received. A processed antenna input vector is generated by performing a circular convolution 440 ($\circledast$) of the antenna input vector ($\bar{y}$) with a first weighting vector ($\bar{w}_e^1$) (i.e., a layer-specific antenna spectrum weighting vector) and a processed angular spectrum vector is generated by performing a circular convolution 440 ($\circledast$) of the refined angular spectrum vector ($x_1$) with a second weighting vector ($\bar{w}_t^1$) (i.e., a layer-specific angular spectrum weighting vector). Next, another refined angular spectrum vector ($x_2$) is generated by applying a non-linear activation function 444 ($\lambda_1$) (e.g., a soft thresholding function) to the sum (442) of the processed antenna input vector and the processed angular spectrum vector. In one or more embodiments, the non-linear activation function specifies a non-linear mapping between input component values and output component values. In one or more embodiments, the vector processing units retrieve data that describes the appropriate non-linear activation function for that vector processing unit, e.g., $\lambda_1$ for layer 1, $\lambda_2$ for layer 2, and $\lambda_{L-1}$ for layer L. In one nonlimiting example, the vector processing unit retrieves data points that explicitly describe the mapping of input values to output values of the function. In another non-limiting example, the vector processing unit retrieves parameter values sufficient to reconstruct the function, non-limiting examples of which include a minimum value of the function, a maximum value of the function, a width parameter identifying, and an offset parameters indicating input values corresponding to a threshold of the function.

The process is repeated for each layer in the circular convolutional neural network. For example, the number of layers may range from 10-30, and in one embodiment, the number of layers is 30 (L=30) although other numbers of layers are possible. At the L-th layer (e.g., layer L), the antenna input vector ($\bar{y}$) and the refined angular spectrum vector ($x_{L-1}$) are received. A processed antenna input vector is generated by performing a circular convolution 440 ($\circledast$) of the antenna input vector ($\bar{y}$) with a first weighting vector ($\bar{w}_e^{L-1}$) (i.e., a layer-specific antenna spectrum weighting vector) and a processed angular spectrum vector is generated by performing a circular convolution 440 ($\circledast$) of the refined angular spectrum vector ($x_{L-1}$) with a second weighting vector ($\bar{w}_t^{L-1}$) (i.e., a layer-specific angular spectrum weighting vector). Next, another refined angular spectrum vector ($x_L$) is generated by applying a non-linear activation function 444 ($\lambda_{L-1}$) (e.g., a soft thresholding function) to the sum (442) of the processed antenna input vector and the processed angular spectrum vector. In one or more embodiments, the non-linear activation function specifies a non-linear mapping between input component values and output component values.

Figure 5:
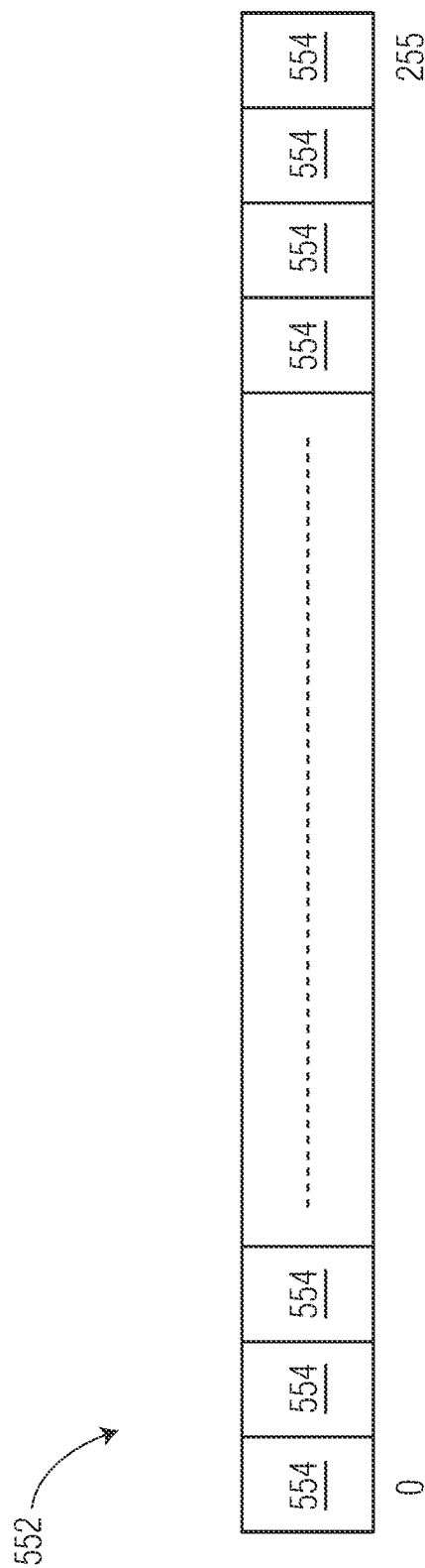
FIG. 5 depicts an example of an angular spectrum vector that is output from the CC-LISTA.

Since layer L is the last layer in the process, the refined angular spectrum vector ($x_L$) is considered the final angular spectrum vector. That is, the L-th angular spectrum vector ($x_L$) can be used to generate the final DOA estimate for one or more radar targets with respect to the array of antennas of the radar system. The angular spectrum vectors indicate a likelihood of a return signal originating from ranges of angles corresponding to each component of the angular spectrum vector. FIG. 5 depicts an example of an angular spectrum vector (x) 552 that is output from the network structure 450, which is configured to implement CC-LISTA. In the example of FIG. 5, the angular spectrum vector includes 256 values that correspond to 256 angular bins 554, e.g., N=256 and each value in the angular spectrum vector is a coefficient indicative of the presence, or absence, of a target, e.g., each value is a complex value that represents an estimate of a magnitude and a phase of a reflection coefficient.

In one or more embodiments, the circular convolutional neural network 450 of FIG. 4 is implemented in the cluster 234 of vector processing units 236 of the signal processing unit 214 of FIG. 2. For example, the circular convolutions 440 at each layer are performed by the circular convolution engine 240 of each vector processing unit 236, the vector summing 442 at each layer is performed by the vector summing engine 242 of each vector processing unit, and the non-linear function 444 is performed by the activation engine 244 of each vector processing unit. In one or more embodiments, the vector processing units are implemented in application specific integrated circuits (ASICs) that include hardware circuits specifically configured to perform the corresponding circular convolution, summing, and activation operations. For example, each vector processing unit includes unit-specific circular convolution circuits dedicated to performing the circular convolutions, unit-specific summing circuits dedicated to performing the summing, and unit-specific activation function circuits dedicated to performing the non-linear activation function. In one or more embodiments, the signal processing unit 214 is implemented in hardware as a stand-alone IC device, e.g., with the circuits corresponding to the range Doppler processing engine 230, circuits corresponding to the antenna array construction engine 232, circuits corresponding to the cluster of vector processing units 236, and circuits corresponding to the memory 238 fabricated on the same semiconductor substrate.

It will be appreciated that, although the first layer 436 of FIG. 4 is depicted as receiving only the antenna input vector as an input, in or more embodiments, a first layer 436 and subsequent layers 436 may be implemented by substantially identical vector processing units (e.g., vector processing units 236) that are operable to receive two inputs. In one or more embodiments, a vector processing unit implementing the first layer may be configured to receive only one input vector. In one or more embodiments, a vector processing unit implementing a first layer 436 may be provided with a zero-valued vector as a second input.

Experiments were performed to characterize the performance characteristics of radar signal processing devices according to embodiments herein that incorporate CC-LISTA and qualitative and quantitative results of these experiments are described below to illustrate features of methods and devices according to embodiments herein. For example, the various techniques (e.g., zero-padded FFT, FISTA, T-LISTA, and CC-LISTA) were simulated in software and experiments were conducted using the simulations. Training data, validation data, and test data were generated synthetically using the radar signal model as described above. In one example experiment, the number of antennas M was 32, and the number of angle bins N was 256 and 16,384 samples were generated for the training. For simulating one training data, the number of targets was randomly chosen from the set {1, 2, . . . , 6} and then the normalized frequency (i.e., angular position) was determined randomly from [0, 1) (e.g., $0 \le f_k < 1$). For the reflection coefficient (x), as it is a complex number, its magnitude and phase were chosen separately from [0.8, 1] and [0, $2\pi$) (e.g., (e.g., $0 \le x < 2\pi$), respectively. Validation data were simulated in the same way, and 256 samples were generated. The validation data were used for monitoring training and for model selection. For the test set, a total of 1,536 samples were generated, but the number of targets was equally distributed (e.g., 256×6), unlike the training and validation data sets.

As the goal is to find targets from DOA estimation, the phase information in the final solution is not necessary. So, the loss function was calculated with the magnitude of the ground truth $\|x\|$ and recovered signal $\|\hat{x}\|$. Structural similarity (SSIM) loss was used as the loss function, which is given by:

$$\mathcal{L}_{SSIM}(x,\hat{x}) = 1 - SSIM(\|x\|, \|\hat{x}\|) \tag{12}$$

The SSIM loss typically performs better in reconstructing edges in image reconstruction than other loss functions such as mean squared error or mean absolute error. Therefore, the structure of sparse signals can be captured better by the SSIM loss.

Figure 6:
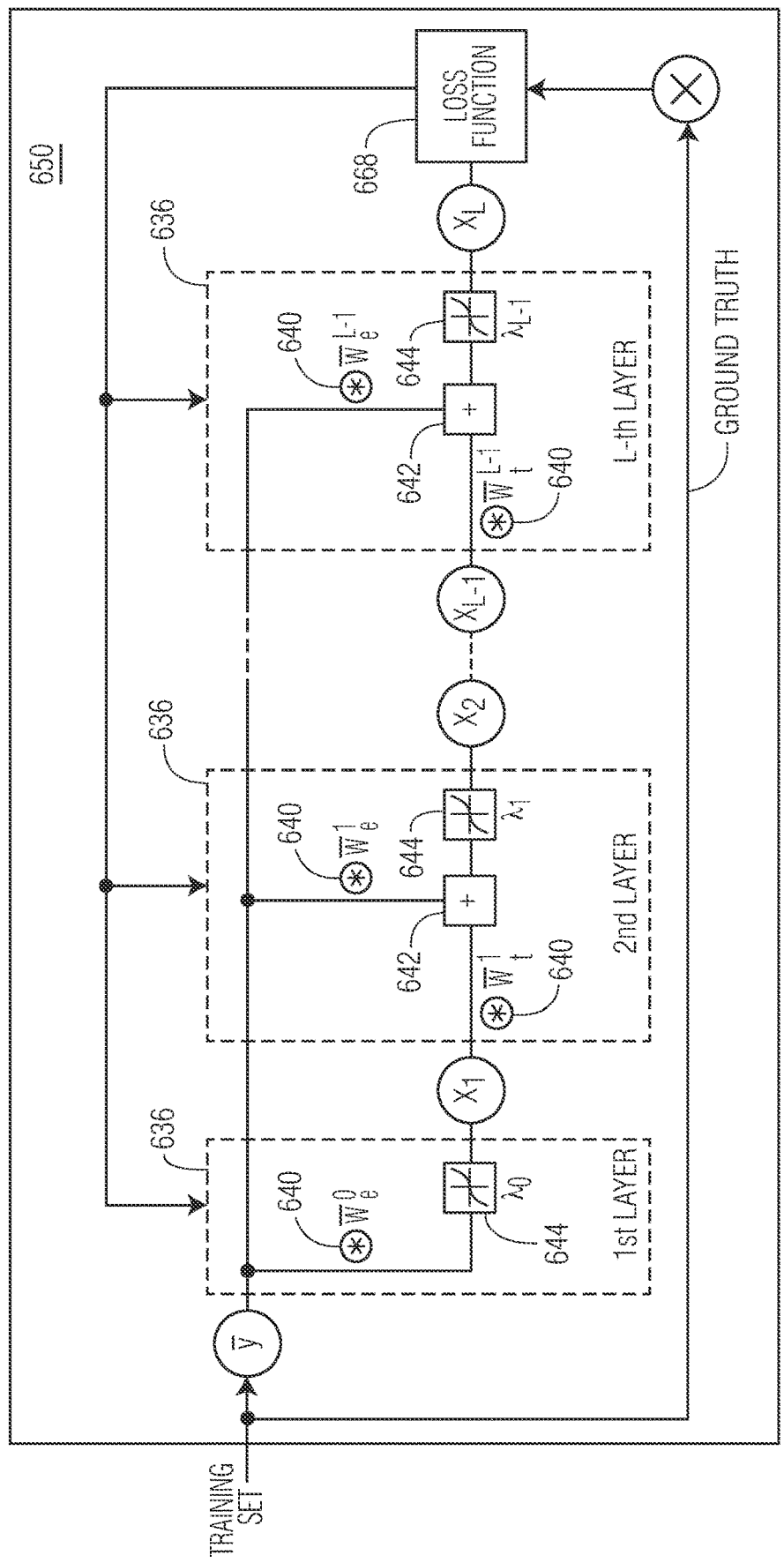
FIG. 6 is a functional block diagram of an example network structure that can be used to train the CC-LISTA.

FIG. 6 is a functional block diagram of an example circular convolutional neural network 650 that can be used to train the CC-LISTA. As illustrated in FIG. 6, a training set includes transformed measurement vectors ($\bar{y}$) and corresponding angular spectrum vectors (x) as the ground truths. Losses are determined according to a loss function 668 and the losses are returned to the layers 636 to train the layer-specific weighting vectors ($\bar{w}_e^l$) and ($\bar{w}_r^l$).

In a particular example, two 30-layer (L=30) CC-LISTA networks with the kernel size, K=256 (CC-LISTA$_{256}$) and $_K$=32 (CC-LISTA$_{32}$) were evaluated. The complex learning parameters of the weighting vectors, ($\bar{w}_e^l$) and ($\bar{w}_r^l$), were initialized using the Rayleigh initialization following the Glorot criterion. Training was performed by minimizing the SSIM loss with the learning rate of 0.0001. The batch size was 256, and the number of epochs was 5000. The training data were perturbed by adding Gaussian noise so that the signal-to-noise becomes 30 dB to reflect the noise and achieve better generalization. To avoid the gradients being zeros by soft-thresholding during backpropagation, a sigmoid based smooth soft thresholding operation was used as a non-linear activation function instead, which can be given by:

$$s - prox_{\lambda \|\cdot\|_1}(z) = \frac{z}{(1 + \exp(-(|z| - \lambda)))}, \forall z_i \in \mathbb{C} \tag{13}$$

Fast ISTA (FISTA) and T-LISTA were chosen as baseline methods to compare the performance of CC-LISTA. FISTA is a variant of ISTA that improves the convergence rate of ISTA from $\mathcal{O}(1/L)$ to $\mathcal{O}(1/L^2)$. For the experiments with FISTA, the number of iterations was set to 1,000 with $\lambda$=1. A 30-layer T-LISTA network and a 30-layer CC-LISTA were both implemented in software-based experiments. However, for training T-LISTA, 1,048,576 training data samples were used with 500 epochs due to its large number of learning parameters. The other training settings were identical to those of CC-LISTA.

The performance of DOA estimation was evaluated in simulations using the true and estimated targets. First of all, the estimated targets were associated with the true targets based on their pairwise distances. However, it can be problematic to associate an estimated target with its closest true target since the true target can be paired with multiple estimated targets. It was, therefore, formulated as a linear assignment problem to avoid such cases. The optimal pairs were found after setting the pairwise distances as a cost matrix.

After the data association, it was determined whether the estimated targets were true positives or false positives based on their localization errors. If the distance to the paired true target was below a certain threshold, an estimated target was classified as a true detection, otherwise an estimated target was classified as a false detection. Here, the threshold of two angle bins was chosen, where 256 angle bins were uniformly defined in the normalized frequency [0,1).

Figure 7C:
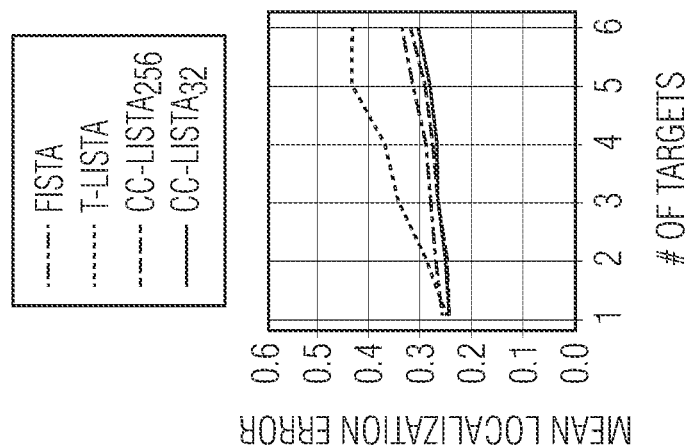
FIG. 7C is a graph of mean localization error vs. the number of targets for the FISTA, T-LISTA, CC-LISTA$_{256}$, and CC-LISTA$_{32}$ methods.
Figure 7B:
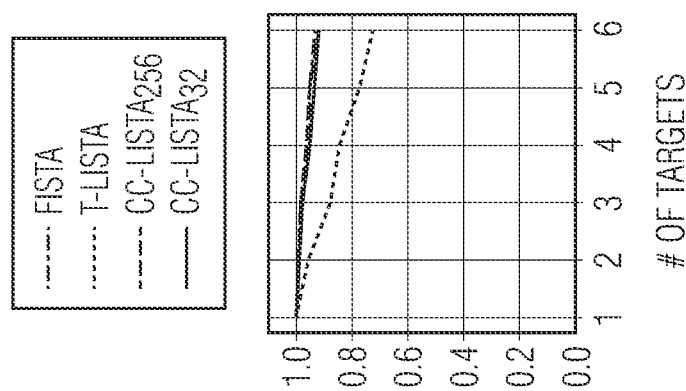
FIG. 7B is a graph of recall vs. the number of targets for the FISTA, T-LISTA, CC-LISTA$_{256}$, and CC-LISTA$_{32}$ methods.
Figure 7A:
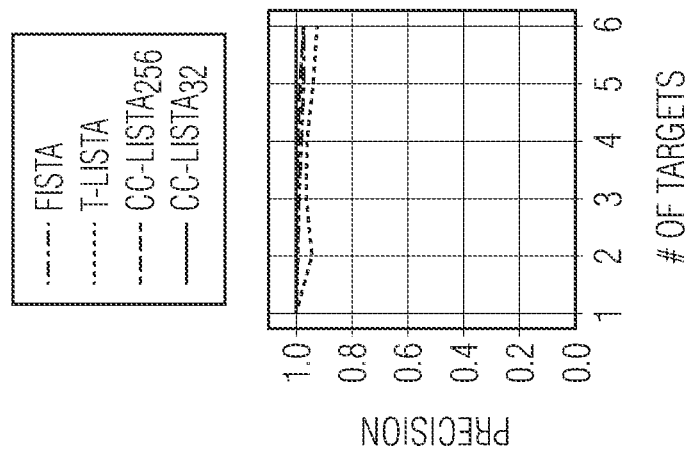
FIG. 7A is a graph of precision vs. the number of targets for the FISTA, T-LISTA, CC-LISTA$_{256}$, and CC-LISTA$_{32}$ methods.

For quantitative evaluation, precision, recall, and mean localization error $\mu_e$ are considered, which are defined as follows:

$$\text{precision} = \frac{TP}{TP + FP} \tag{14}$$

$$\text{recall} = \frac{TP}{TP + FN} \tag{15}$$

$$\mu_e = \sqrt{\frac{\sum_{i=1}^{TP} e_i}{TP}} \tag{16}$$

where TP is the number of true positives, FP is the number of false positives, FN is the number of false negatives, and $e_i$ is the localization error of the i-th pair. Note that the localization errors were calculated only with the true positives. Additionally, CPU time was measured on a compute machine with an AMD Ryzen 5 5600X. Although devices according to embodiments herein may be implemented as ASICs, measurement of CPU time required to simulate operation of such devices can be used to estimate the computational efficiency of embodiments herein. The precision, recall, localization error, and process time of software-based simulations of the FISTA, T-LISTA, CC-LISTA$_{256}$, and CC-LISTA$_{32}$ methods on test data are shown in FIGS. 7A-7D. FIG. 7A is a graph of precision vs. the number of targets for the FISTA, T-LISTA, CC-LISTA$_{256}$, and CC-LISTA$_{32}$ methods, FIG. 7B is a graph of recall vs. the number of targets for the FISTA, T-LISTA, CC-LISTA$_{256}$, and CC-LISTA$_{32}$ methods, and FIG. 7C is a graph of mean localization error vs. the number of targets for the FISTA, T-LISTA, CC-LISTA$_{256}$, and CC-LISTA$_{32}$ methods. As shown in the graphs, the CC-LISTA$_{256}$, and CC-LISTA$_{32}$ methods perform as well or better than the FISTA and T-LISTA methods. FIG. 7D is a table of performance metrics for the FISTA, T-LISTA, CC-LISTA$_{256}$, and CC-LISTA$_{32}$ methods. Of note, the CC-LISTA$_{256}$, and CC-LISTA$_{32}$ methods show significant improvements with respect to CPU time, number of MACs, and number of learning parameters relative to the FISTA and T-LISTA methods.

Figure 8B:
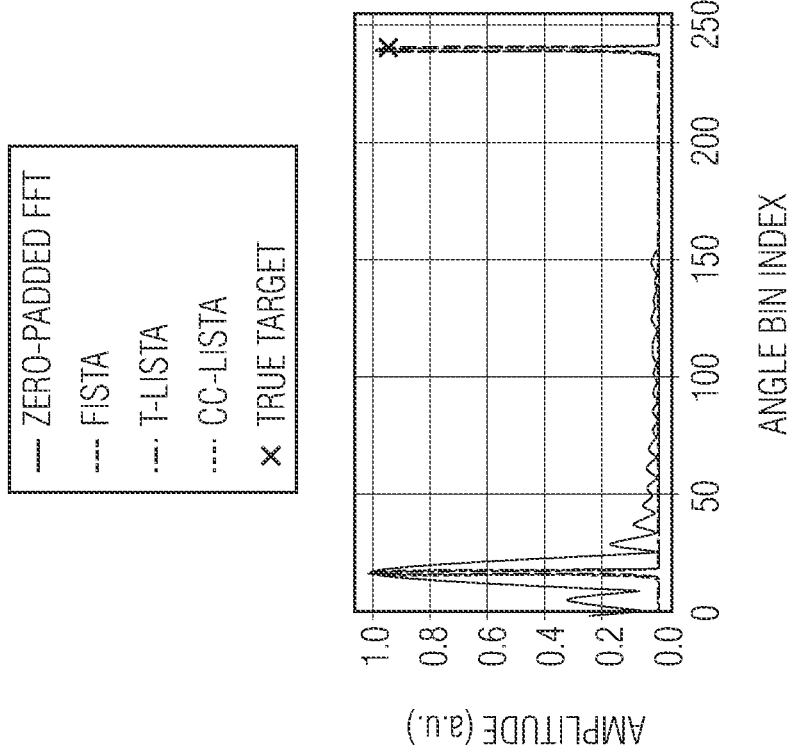
FIG. 8B is a graph of amplitude vs. angle bin index for two targets.
Figure 8A:
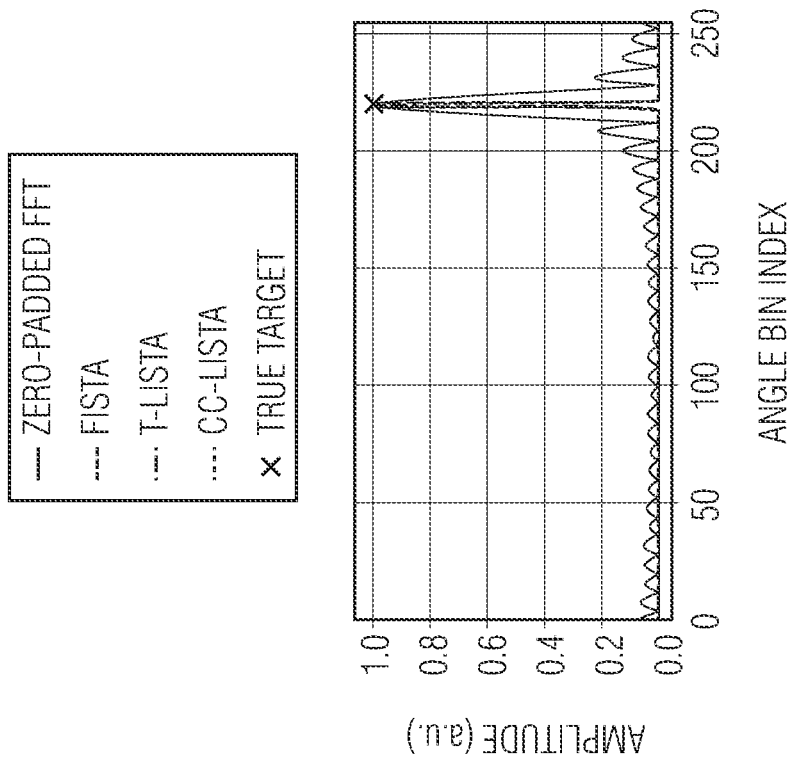
FIG. 8A is a graph of amplitude vs. angle bin index for one target.
Figure 8D:
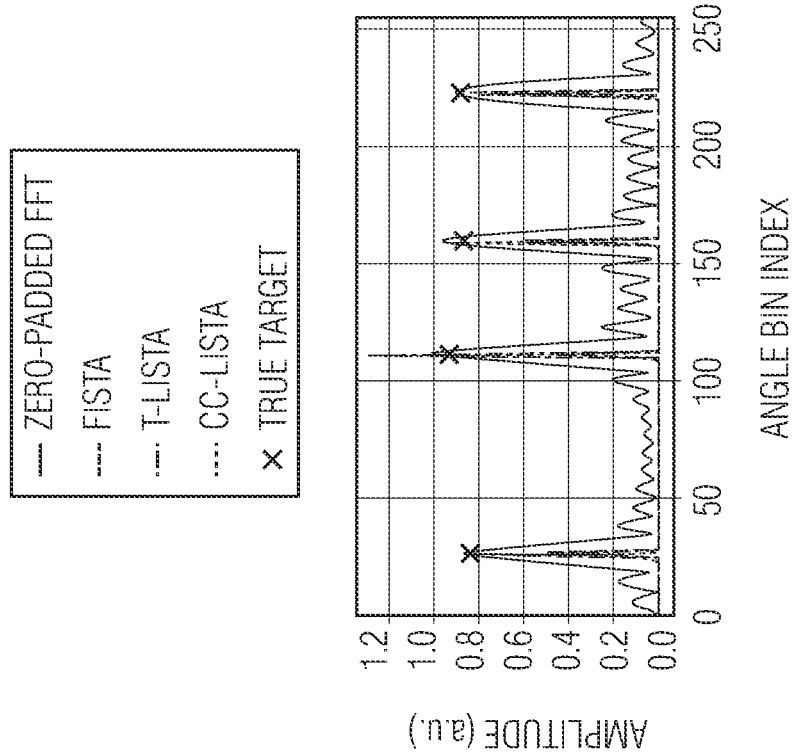
FIG. 8D is a graph of amplitude vs. angle bin index for four targets.
Figure 8C:
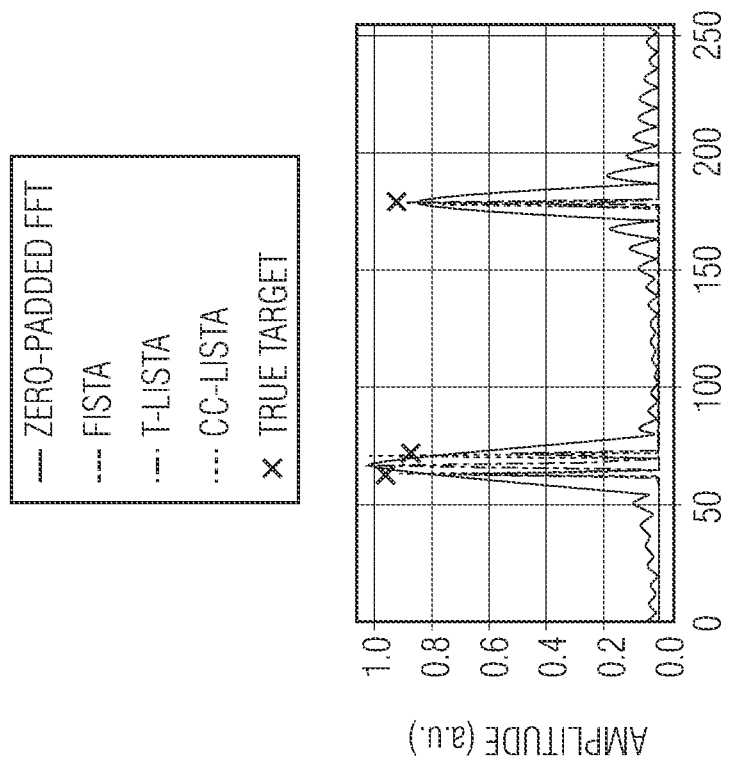
FIG. 8C is a graph of amplitude vs. angle bin index for three targets.
Figure 8F:
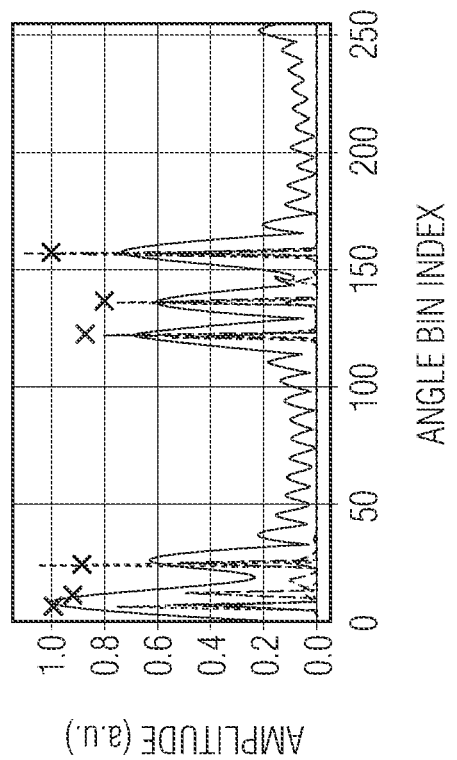
FIG. 8F is a graph of amplitude vs. angle bin index for six targets.
Figure 8E:
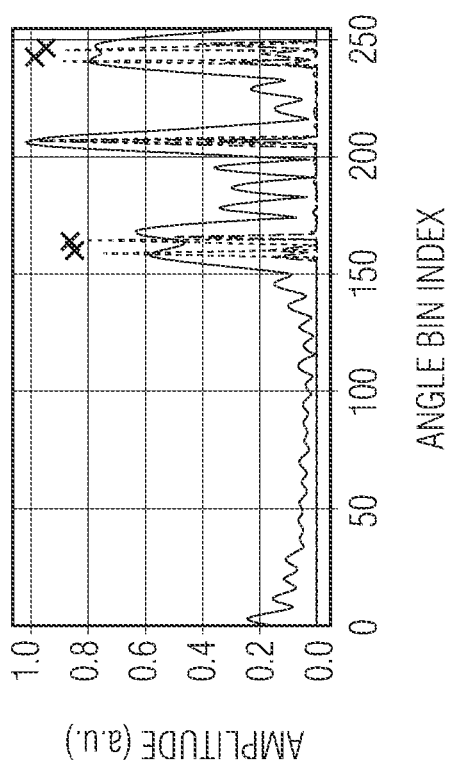
FIG. 8E is a graph of amplitude vs. angle bin index for five targets.

FIGS. 8A-8F depict graphs of amplitude vs. angle bin index for different numbers of targets simultaneously in the radar FOV with respect to the zero-padded FFT, FISTA, T-LISTA, and CC-LISTA$_{256}$ methods. In particular, FIG. 8A is a graph of amplitude vs. angle bin index for one target, FIG. 8B is a graph of amplitude vs. angle bin index for two targets, FIG. 8C is a graph of amplitude vs. angle bin index for three targets, FIG. 8D is a graph of amplitude vs. angle bin index for four targets, FIG. 8E is a graph of amplitude vs. angle bin index for five targets, and FIG. 8F is a graph of amplitude vs. angle bin index for six targets. As shown in FIGS. 8A-8F, in terms of resolving targets, CC-LISTA$_{256}$ performs much better, with fewer sidelobes and false negatives than the other methods.

Figure 9:
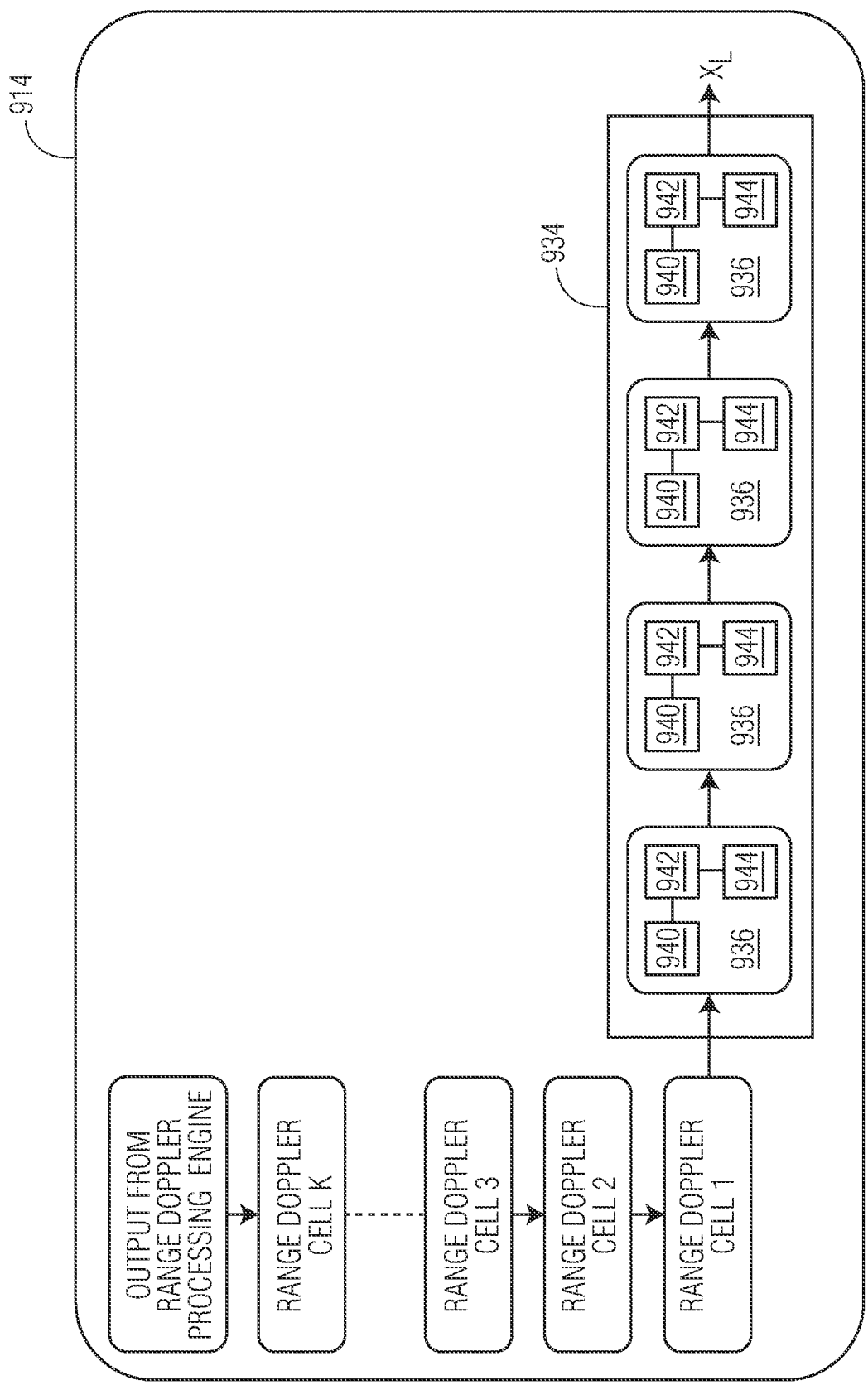
FIG. 9 illustrates an example of the CC-LISTA implemented in a pipelined manner.

The above-described CC-LISTA can be implemented via the vector processing units in different ways. For example, the CC-LISTA can be implemented in a pipelined manner or in a parallel manner. FIG. 9 illustrates an example of the CC-LISTA implemented in a pipelined manner with serially connected vector processing units 936. In the example of FIG. 9, each cell in the range Doppler map that corresponds to a valid target detection is passed sequentially into the cluster 934 of vector processing units 936, for example, each cell is passed as an antenna input vector such as a transformed measurement vector ($\bar{y}$) that is a representation of radar signal amplitudes received by each antenna of an array of antennas. Each vector processing unit 936 in the cluster implements one layer of a multi-layer circular convolutional neural network, with the layers of the circular convolutional neural network corresponding to the layers as described with reference to FIG. 4. For example, from left to right, layer 1 is implemented by the first vector processing unit, layer 2 is implemented by the second vector processing unit, layer 3 is implemented by the third vector processing unit, and layer L is implemented by the fourth vector processing unit. Each vector processing unit is loaded with corresponding layer-specific weighting vectors ($\bar{w}_e^l$ and $\bar{w}_t^l$), which are retrieved from memory (not shown) of the signal processing unit 914, and the antenna spectrum vectors ($\bar{y}$) corresponding to each range Doppler cell is processed sequentially through the layers of the neural network in order (e.g., from the first layer to the L−1 layer, where L is the number of layers). Additionally, in one or more embodiments, the layer-specific vector processing units retrieve data from the memory that describes the appropriate non-linear activation function for that vector processing unit, e.g., $\lambda_1$ for layer 1, $\lambda_2$ for layer 2, and $\lambda_{L-1}$ for layer L. If there are more vector processing units than layers in the CC-LISTA, then each layer can be implemented in a dedicated vector processing unit. However, if there are fewer vector processing units than layers in the CC-LISTA, then a scheduling scheme can be implemented to efficiently manage the loading of layer-specific weighting vector at the circular convolution engines.

Figure 10:
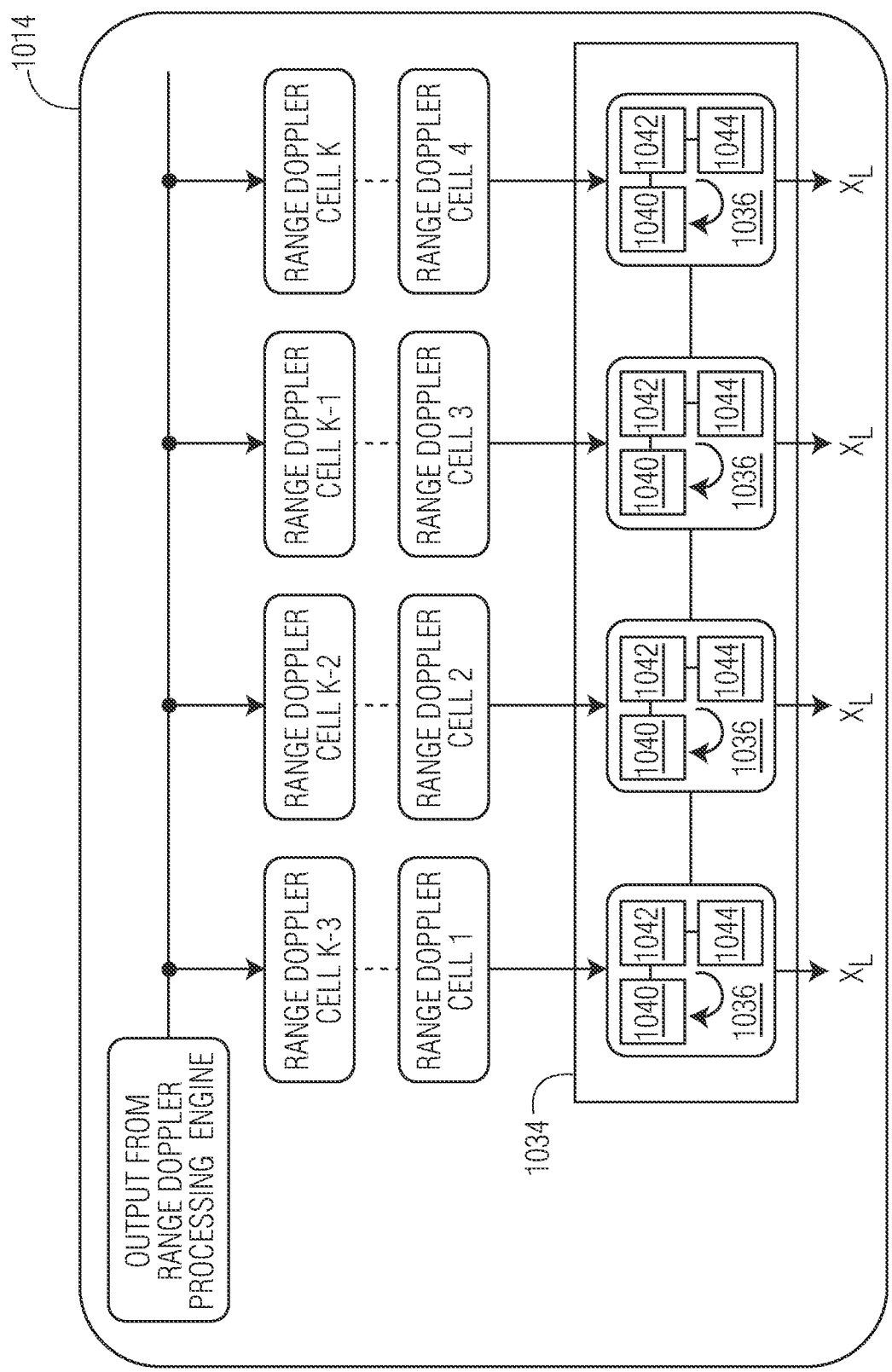
FIG. 10 illustrates an example of the CC-LISTA implemented in a parallel manner.

FIG. 10 illustrates an example of the CC-LISTA implemented in a parallel manner. Here, each cell in the range Doppler map that corresponds to a valid target detection is passed in parallel into a cluster 1034 of vector processing units 1036, for example, each cell is passed as an antenna input vector such as a transformed measurement vector ($\bar{y}$) that is a representation of radar signal amplitudes received by each antenna of an array of antennas. Each vector processing unit 1036 in the cluster implements all L layers of the CC-LISTA, with the layer-specific weighting vectors ($\bar{w}_e^l$ and $\bar{w}_t^l$) being loaded from memory (not shown) into the circular convolution engine for each layer-specific iteration. That is, a single vector processing unit is loaded with each of the layer-specific weighting vectors ($\bar{w}_e^l$ and $\bar{w}_t^l$) and layer-specific activation functions (e.g., $\lambda_1$ for layer 1, $\lambda_2$ for layer 2, and $\lambda_{L-1}$ for layer L) in a sequential manner on a layer-by-layer basis to process the angular spectrum vector ($\bar{y}$) corresponding to one range Doppler cell. The process can be repeated across the set of vector processing units to process multiple different cells in parallel.

Although two specific examples of pipelined and parallel processing are described, other approaches are possible. Additionally, is some embodiments, a hybrid pipelined/parallel approach may be possible. Further, it may be that in some situations a pipelined approach works better than a parallel approach while in other situations a parallel approach works better than the pipelined approach.

Figure 11:
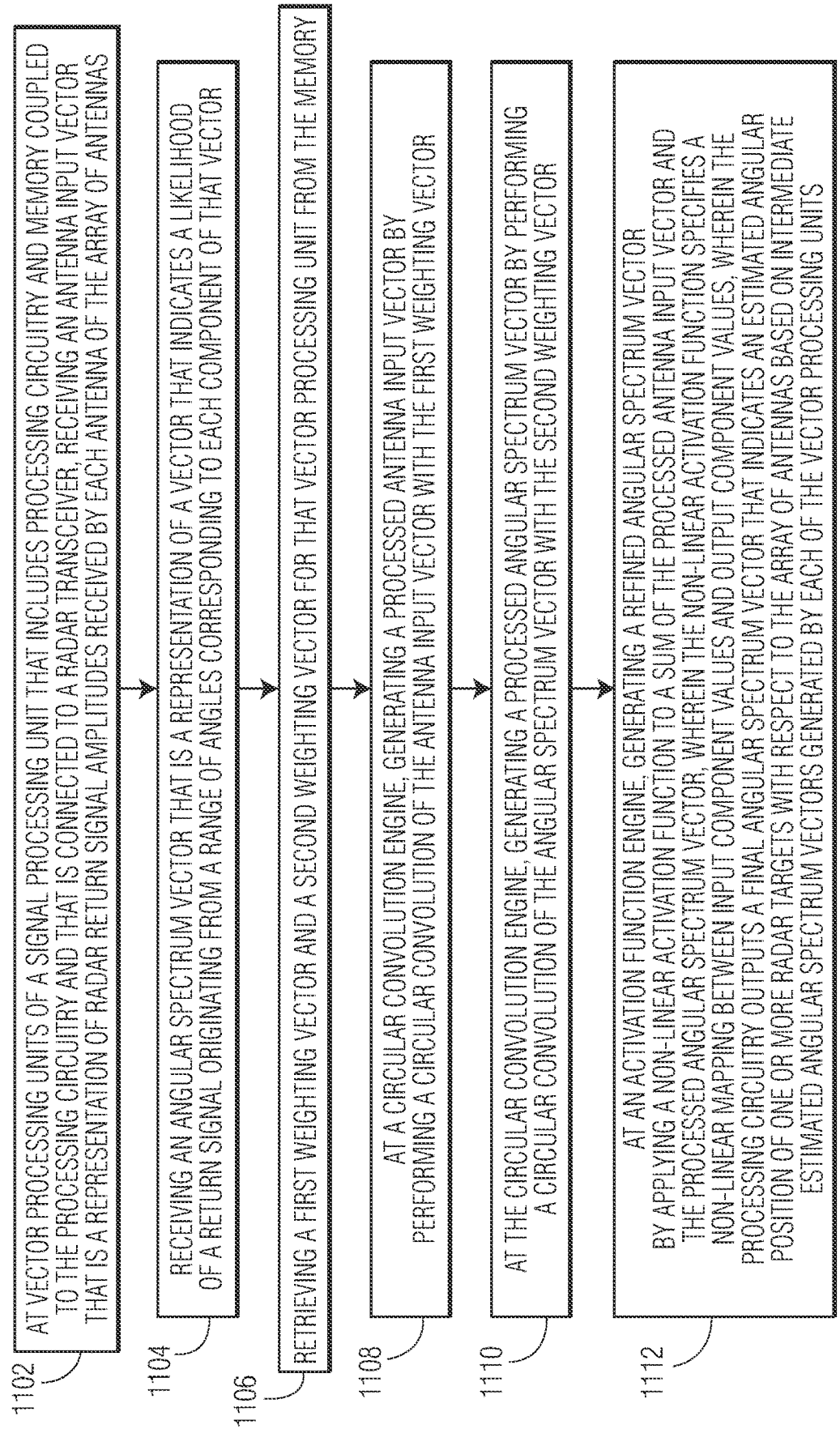
FIG. 11 is a process flow diagram of a method for estimating a DOA from radar signals.

FIG. 11 is a process flow diagram of a method for estimating a DOA from radar signals at vector processing units of a signal processing unit that includes processing circuitry and memory coupled to the processing circuitry and that is connected to a radar transceiver. At block 1102, an antenna input vector that is a representation of radar return signal amplitudes received by each antenna of the array of antennas is received. At block 1104, the process involves receiving an angular spectrum vector that indicates a likelihood of a return signal originating from a range of angles corresponding to each component of that vector. At block 1106, the process involves retrieving a first weighting vector and a second weighting vector for that vector processing unit from the memory. At block 1108, the process involves, at a circular convolution engine, generating a processed antenna input vector by performing a circular convolution of the antenna input vector with the first weighting vector. At block 1110, the process involves, at the circular convolution engine, generating a processed angular spectrum vector by performing a circular convolution of the angular spectrum vector with the second weighting vector. At block 1112, the process involves, at an activation function engine, generating a refined angular spectrum vector by applying a non-linear activation function to a sum of the processed antenna input vector and the processed angular spectrum vector, wherein the non-linear activation function specifies a non-linear mapping between input component values and output component values, wherein the processing circuitry outputs a final angular spectrum vector that indicates an estimated angular position of one or more radar targets with respect to the array of antennas based on refined angular spectrum vectors generated by each of the vector processing units.

Aspects of the present disclosure are applicable to a variety of different types of apparatuses, systems, and methods involving radar sensing for realizing increased resolution of spatial ambiguities at least in terms of direction of arrival (DOA). Certain aspects of the present disclosure have been shown to be beneficial when used in the context of automotive applications such as for automatic cruise control (ACC), front cross traffic alert (FCTA), and automatic emergency breaking (AEB). In some embodiments, imaging radar uses multiple distinct field of views to fulfill the requirements associated with different forward-looking automotive applications. While examples discussed herein may be described using such aspects and applications for discussion purposes, it will be appreciated that other aspects and embodiments associated with the present disclosure are not necessarily so limited.

Embodiments of the invention may be implemented entirely in hardware or in an implementation containing both hardware and software elements. In one or more embodiments, the vector processing units are implemented in hardware as ASICs with specific hardware circuits (including logic and memory) configured to implement the circular convolution engine, the vector summing engine, and the activation engine of each vector processing unit. In embodiments which use software, the software may include but is not limited to firmware, resident software, microcode, etc.

It should also be noted that at least some of the operations for the methods described herein may be implemented using software instructions stored on a computer useable storage medium (e.g., memory circuits) for execution by the digital baseband processor. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A radar system comprising:
   an array of antennas;
   a radar transceiver connected to the array of antennas; and
   a signal processing unit connected to the radar transceiver and that includes processing circuitry and memory coupled to the processing circuitry, wherein the processing circuitry includes multiple vector processing units, each vector processing unit configured to:
      receive an antenna input vector that is a representation of radar return signal amplitudes received by each antenna of the array of antennas;
      receive an angular spectrum vector that indicates a likelihood of a return signal originating from ranges of angles corresponding to each component of the input vector;
      retrieve a first weighting vector and a second weighting vector for one or more vector processing units of the multiple vector processing units from the memory;
      generate a processed antenna input vector by performing a circular convolution of the antenna input vector with the first weighting vector;
      generate a processed angular spectrum vector by performing a circular convolution of the angular spectrum vector with the second weighting vector; and
      generate a refined angular spectrum vector by applying a non-linear activation function to a sum of the processed antenna input vector and the processed angular spectrum vector, wherein the non-linear activation function specifies a non-linear mapping between input vector component values of the processed antenna input vector and output vector component values of the refined angular spectrum vector;
   wherein the processing circuitry is configured to output a final angular spectrum vector that indicates an estimated angular position of one or more radar targets with respect to the array of antennas based on the refined angular spectrum vectors generated by each of the vector processing units.

2. The radar system of claim 1, wherein the signal processing unit includes an initial vector processing unit configured to:
   receive the antenna input vector;
   retrieve the first weighting vector for the initial vector processing unit from the memory;
   generate a processed antenna input vector by performing a circular convolution of the antenna input vector with the first weighting vector; and
   generate the refined angular spectrum vector by applying the non-linear activation function to the processed antenna input vector, wherein the non-linear activation function specifies the non-linear mapping between the input vector component values and the output vector component values.

3. The radar system of claim 1, wherein the signal processing unit includes a transformation engine configured to receive radar return signals, generate a transformed measurement vector representing the radar return signals, and to provide the transformed measurement vector to the vector processing units as the antenna input vector.

4. The radar system of claim 1, wherein each vector processing unit of the multiple vector processing units includes circular convolution circuits dedicated to performing the circular convolutions, summing circuits dedicated to performing the summing, and activation function circuits dedicated to performing the non-linear activation function.

5. A device comprising:
   a signal processing unit that includes processing circuitry and memory coupled to the processing circuitry, wherein the processing circuitry includes multiple vector processing units, each vector processing unit configured to:
      receive an antenna input vector that is a representation of radar return signal amplitudes received by each antenna of an array of antennas;
      receive an angular spectrum vector that indicates a likelihood of a return signal originating from ranges of angles corresponding to each component of the antenna input vector;
      retrieve a first weighting vector and a second weighting vector for each vector processing unit of the multiple vector processing units from the memory;
      generate a processed antenna input vector by performing a circular convolution of the antenna input vector with the first weighting vector;
      generate a processed angular spectrum vector by performing a circular convolution of the angular spectrum vector with the second weighting vector; and
      generate a refined angular spectrum vector by applying a non-linear activation function to a sum of the processed antenna input vector and the processed angular spectrum vector, wherein the non-linear activation function specifies a non-linear mapping between input vector component values of the processed antenna input vector and output vector component values of the refined angular spectrum vector;
   wherein the processing circuitry is configured to output a final angular spectrum vector that indicates an estimated angular position of one or more radar targets with respect to the array of antennas based on the refined angular spectrum vectors generated by each of the vector processing units.

6. The device of claim 5, wherein the signal processing unit includes an initial vector processing unit configured to:
receive the antenna input vector;
retrieve the first weighting vector for the initial vector processing unit from the memory;
generate a processed antenna input vector by performing a circular convolution of the antenna input vector with the first weighting vector; and
generate a refined angular spectrum vector by applying the non-linear activation function to the processed antenna input vector, wherein the non-linear activation function specifies the non-linear mapping between the input vector component values and the output vector component values.

7. The device of claim 5, wherein the signal processing unit includes a transformation engine configured to receive radar return signals, generate a transformed measurement vector representing the radar return signals, and to provide the transformed measurement vector to the vector processing units as the antenna input vector.

8. The device of claim 5, wherein the non-linear activation function is a sigmoid based smooth soft thresholding function.

9. The device of claim 5, wherein each vector processing unit of the multiple vector processing units includes circular convolution circuits dedicated to performing the circular convolutions, summing circuits dedicated to performing the summing, and activation function circuits dedicated to performing the non-linear activation function.

10. The device of claim 5, wherein the multiple vector processing units are configured for pipelined processing in which each vector processing unit of the multiple vector processing units performs the circular convolutions with first and second weighting vectors that are specific to the multiple vector processing units.

11. The device of claim 10, wherein the vector processing units are serially connected such that an intermediate estimated angular spectrum output vector from a first vector processing unit of the serially connected vector processing units is provided as the angular spectrum vector to a next vector processing unit of the serially connected vector processing units.

12. The device of claim 5, wherein the antenna input vector corresponds to a cell in a range Doppler map that indicates the presence of a target and wherein the antenna input vector is processed by the multiple vector processing units serially using first and second weighting vectors that are unique to each one of the multiple vector processing units for the circular convolutions.

13. The device of claim 5, wherein the multiple vector processing units are configured for parallel processing in which a single vector processing unit of the multiple vector processing units performs the circular convolutions, the summing, and the application of the non-linear function for each layer of a multilayer process, and wherein each layer of the multilayer process utilizes layer-specific first and second weighting vectors for the circular convolutions.

14. The device of claim 13, wherein the layer-specific first and second weighting vectors utilized for the circular convolutions are changed at the single vector processing unit to correspond to each layer of the multilayer process.

15. A method for estimating a direction of arrival (DOA) from radar signals, the method comprising:
at vector processing units of a signal processing unit that includes processing circuitry and memory coupled to the processing circuitry and that is connected to a radar transceiver:
receiving an antenna input vector that is a representation of radar return signal amplitudes received by each antenna of an array of antennas;
receiving an angular spectrum vector that indicates a likelihood of a return signal originating from ranges of angles corresponding to each component of the antenna input vector;
retrieving a first weighting vector and a second weighting vector for one of the vector processing units of the vector processing units from the memory;
at a circular convolution engine, generating a processed antenna input vector by performing a circular convolution of the antenna input vector with the first weighting vector;
at the circular convolution engine, generating a processed angular spectrum vector by performing a circular convolution of the angular spectrum vector with the second weighting vector; and
at an activation function engine, generating a refined angular spectrum vector by applying a non-linear activation function to a sum of the processed antenna input vector and the processed angular spectrum vector, wherein the non-linear activation function specifies a non-linear mapping between input vector component values of the processed antenna input vector and output vector component values of the refined angular spectrum vector;
wherein the processing circuitry outputs a final angular spectrum vector that indicates an estimated angular position of one or more radar targets with respect to the array of antennas based on refined angular spectrum vectors generated by each of the vector processing units.

16. The method of claim 15, wherein the signal processing unit includes initial steps of:
receiving the antenna input vector;
retrieving the first weighting vector for the initial vector processing unit from the memory;
generating a processed antenna input vector by performing a circular convolution of the antenna input vector with the first weighting vector; and
generating a refined angular spectrum vector by applying a non-linear activation function to the processed antenna input vector, wherein the non-linear activation function specifies a non-linear mapping between the input vector component values and the output vector component values.

17. The method of claim 15, wherein the non-linear activation function is a sigmoid based smooth soft thresholding function.

18. The method of claim 15, wherein the vector processing units are configured for pipelined processing in which each vector processing unit of the multiple vector processing units performs the circular convolutions with first and second weighting vectors that are specific to the multiple vector processing units.

19. The method of claim 15, wherein the vector processing units are serially connected such that the refined angular spectrum vector from a first vector processing unit of the serially connected vector processing units is provided as the angular spectrum vector to a next vector processing unit of the serially connected vector processing units.

20. The method of claim 19, wherein the antenna input vector corresponds to a cell in a range Doppler map that indicates the presence of a target and wherein the antenna input vector is processed by the vector processing units serially using first and second weighting vectors that are unique to each one of the vector processing units for the circular convolutions.

21. The method of claim 15, wherein the vector processing units are configured for parallel processing in which a single vector processing unit of the vector processing units performs the circular convolutions, the summing, and the application of the non-linear function for each layer of a multilayer process, and wherein each layer of the multilayer process utilizes layer-specific first and second weighting vectors for the circular convolutions.

22. The method of claim 21, wherein the layer-specific first and second weighting vectors utilized for the circular convolutions are changed at the single vector processing unit to correspond to each layer of the multilayer process.

* * * * *